(12) United States Patent
Tuason et al.

(10) Patent No.: US 7,879,382 B2
(45) Date of Patent: Feb. 1, 2011

(54) STABILIZERS AND COMPOSITIONS AND PRODUCTS COMPRISING SAME

(75) Inventors: Domingo C. Tuason, Bensalem, PA (US); Gregory R. Krawczyk, Princeton Junction, NJ (US); Michael Cammarata, Fallsington, PA (US); Janet Van Mol, Princeton, NJ (US); Edward Selinger, Langhorne, PA (US)

(73) Assignee: FMC Corporation, Philadelphia, PA (US)

( * ) Notice: Subject to any disclaimer, the term of this patent is extended or adjusted under 35 U.S.C. 154(b) by 1144 days.

(21) Appl. No.: 11/536,436

(22) Filed: Sep. 28, 2006

(65) Prior Publication Data

US 2007/0128333 A1 Jun. 7, 2007

Related U.S. Application Data

(60) Provisional application No. 60/722,720, filed on Sep. 30, 2005, provisional application No. 60/775,884, filed on Feb. 23, 2006, provisional application No. 60/818,017, filed on Jun. 30, 2006, provisional application No. 60/830,565, filed on Jul. 13, 2006.

(51) Int. Cl.
*A23L 1/212* (2006.01)
(52) U.S. Cl. .................................. 426/573; 426/615
(58) Field of Classification Search .............. 426/573, 426/615
See application file for complete search history.

(56) References Cited

U.S. PATENT DOCUMENTS

| | | |
|---|---|---|
| 2,978,446 A | 4/1961 | Battista et al. |
| 3,145,146 A | 8/1964 | Lieberman |
| 3,146,168 A | 8/1964 | Battista |
| 3,539,365 A | 11/1970 | Durand et al. ............ 106/162.8 |
| 3,573,058 A | 3/1971 | Tiemstra |
| 3,639,169 A | 2/1972 | Broeg et al. |
| 4,017,598 A * | 4/1977 | Ohno et al. .................. 424/469 |
| 4,110,476 A * | 8/1978 | Rhodes ......................... 426/41 |
| 4,263,334 A | 4/1981 | McGinley |
| 4,264,637 A | 4/1981 | Braverman |
| 4,426,518 A | 1/1984 | Omiya .......................... 536/98 |
| 4,693,750 A | 9/1987 | Bauer et al. |
| 4,744,987 A | 5/1988 | Mehra et al. |
| 4,980,193 A | 12/1990 | Tuason, Jr. et al. |
| 5,082,684 A | 1/1992 | Fung |
| 5,192,569 A | 3/1993 | McGinley et al. |
| 5,272,137 A | 12/1993 | Blase et al. |
| 5,286,510 A | 2/1994 | Bauer et al. |

(Continued)

FOREIGN PATENT DOCUMENTS

EP 1226818 A1 7/2002

(Continued)

OTHER PUBLICATIONS

Mitchell, S.A., et al., 'A Compaction Process to enhance dissolution of poorly water-soluble drugs using hydroxypropyl methylcellulose'. International Journal of Pharmaceutics, 250, pp. 3-11, 2003.

(Continued)

*Primary Examiner*—Anthony Weier

(57) ABSTRACT

Compositions containing microcrystalline cellulose, cellulose ether, and salt are provided together with methods for making them. Additionally, there are also described edible food products and industrial suspensions formed from these compositions.

20 Claims, 3 Drawing Sheets

U.S. PATENT DOCUMENTS

| | | | |
|---|---|---|---|
| 5,366,742 | A | 11/1994 | Tuason, Jr. et al. |
| 5,409,907 | A | 4/1995 | Blase et al. |
| 5,415,804 | A | 5/1995 | Minami |
| 5,505,982 | A | 4/1996 | Krawczyk et al. |
| 5,573,777 | A | 11/1996 | Serpelloni et al. |
| 5,605,712 | A | 2/1997 | Bertrand et al. |
| 5,607,716 | A | 3/1997 | Doherty et al. |
| 5,609,898 | A * | 3/1997 | Kaji et al. ............... 426/74 |
| 5,709,896 | A | 1/1998 | Hartigan et al. |
| 5,725,886 | A | 3/1998 | Erkoboni et al. |
| 5,747,067 | A | 5/1998 | Auguello et al. |
| 5,769,934 | A | 6/1998 | Ha et al. |
| 5,789,004 | A | 8/1998 | Hogan et al. |
| 5,866,166 | A | 2/1999 | Staniforth et al. |
| 6,010,734 | A * | 1/2000 | Whelan et al. ............... 426/565 |
| 6,025,007 | A | 2/2000 | Krawczyk |
| 6,037,380 | A | 3/2000 | Venables et al. |
| 6,079,630 | A | 6/2000 | Schroeder |
| 6,106,865 | A | 8/2000 | Staniforth et al. |
| 6,117,474 | A | 9/2000 | Kamada et al. |
| 6,235,947 | B1 | 5/2001 | Yoshinari et al. |
| 6,264,981 | B1 | 7/2001 | Zhang et al. |
| 6,270,830 | B1 | 8/2001 | Kamada et al. |
| 6,368,649 | B1 | 4/2002 | van Bommel |
| 6,391,368 | B1 | 5/2002 | Tuason et al. |
| 6,432,448 | B1 | 8/2002 | Augello et al. |
| 6,440,474 | B1 | 8/2002 | Buliga et al. |
| 6,475,539 | B1 | 11/2002 | DeWille et al. |
| 6,500,462 | B1 | 12/2002 | Augello et al. |
| 6,503,918 | B2 | 1/2003 | Yoshinari et al. |
| 6,517,871 | B1 | 2/2003 | Venkatesh et al. |
| 6,548,093 | B1 | 4/2003 | Collinge et al. |
| 6,689,405 | B1 | 2/2004 | Tuason et al. |
| 6,709,713 | B2 | 3/2004 | Augello et al. |
| 6,723,342 | B1 | 4/2004 | Augello et al. |
| 6,726,949 | B2 * | 4/2004 | Adolphi et al. ............... 426/565 |
| 6,752,939 | B2 | 6/2004 | Gereg |
| 6,753,017 | B2 | 6/2004 | Berkulin et al. |
| 6,936,277 | B2 | 8/2005 | Staniforth et al. |
| 6,936,628 | B2 | 8/2005 | Lee |
| 7,462,232 | B2 | 12/2008 | Tuason et al. |
| 7,625,622 | B2 | 12/2009 | Teckoe et al. |
| 7,785,089 | B2 | 8/2010 | Teckoe et al. |
| 2003/0017204 | A1 | 1/2003 | Augello et al. |
| 2003/0129238 | A1 | 7/2003 | Augello et al. |
| 2004/0071821 | A1 | 4/2004 | Ashourian et al. |
| 2004/0121006 | A1 | 6/2004 | Narita et al. |
| 2004/0137043 | A1 | 7/2004 | Augello et al. |
| 2004/0185161 | A1 | 9/2004 | Ashourian et al. |
| 2005/0147710 | A1 | 7/2005 | Teckoe et al. |
| 2005/0220824 | A1 | 10/2005 | Kessel et al. |
| 2005/0233046 | A1 | 10/2005 | Krawczyk et al. |
| 2005/0233053 | A1 | 10/2005 | Shen et al. |
| 2005/0258827 | A1 | 12/2005 | Shen et al. |
| 2005/0266116 | A1 | 12/2005 | Teckoe et al. |
| 2006/0127451 | A1 | 6/2006 | Augello et al. |
| 2008/0131505 | A1 | 6/2008 | Li et al. |
| 2008/0131543 | A1 | 6/2008 | Teckoe et al. |
| 2008/0213360 | A1 | 9/2008 | Thoorens et al. |
| 2009/0110799 | A1 | 4/2009 | Funami et al. |
| 2009/0130287 | A1 | 5/2009 | Tuason et al. |

FOREIGN PATENT DOCUMENTS

| | | |
|---|---|---|
| EP | 1 681 048 A1 | 7/2006 |
| GB | 1010477 | 11/1965 |
| GB | 1 567 049 | 5/1980 |
| GB | 2395413 A | 5/2004 |
| JP | 08-151481 A | 6/1996 |
| JP | 9266779 | 10/1997 |
| JP | 10-056960 | 3/1998 |
| JP | 10-237220 A | 9/1998 |
| JP | 11-046723 A | 2/1999 |
| JP | 11-299435 A | 11/1999 |
| JP | 2000-184853 | 7/2000 |
| JP | 2001-190220 A | 7/2001 |
| JP | 2002-125587 A | 5/2002 |
| JP | 2002345401 A1 | 12/2002 |
| JP | 2005-245217 | 9/2005 |
| WO | WO 81-02521 A1 | 9/1981 |
| WO | WO 94/24888 A1 | 11/1994 |
| WO | WO 98/56826 A1 | 12/1998 |
| WO | WO 00/04862 A2 | 2/2000 |
| WO | WO 01/19348 A1 | 3/2001 |
| WO | WO 0132150 | 5/2001 |
| WO | WO 0132152 | 5/2001 |
| WO | WO 02/49451 A2 | 6/2002 |
| WO | WO 03/003843 A1 | 1/2003 |
| WO | 03/096976 A2 | 11/2003 |
| WO | WO 03/090558 A1 | 11/2003 |
| WO | WO 2005/030177 A2 | 4/2005 |
| WO | 2005/096832 A2 | 10/2005 |
| WO | WO 2006/131963 A1 | 12/2006 |

OTHER PUBLICATIONS

Kleinebudde, P., 'Roll Compaction/Dry Granulation: Pharmaceutical Applications'. European Journal of Pharmaceutics and biopharmaceutics, 58, pp. 317-326, 2004.

Deyampert Rogers, Tracey L., 'Content Considerations for Low Dosage Drug Formulations Processed by Roller Compaction'. Ph.D. Thesis, Purdue University, Aug. 1997.

Deyampert Rogers, Tracey L., 'Oral Preliminary Examination', Sep. 1, 1995.

Falzone, Angela Marie, 'Roller Compaction of Pharmaceutical Excipients and Excipient-drug Blends'. Ph.D. Thesis, Purdue University, Dec. 1990.

Skinner, G.W., 'The Evaluation of Fine-particle Hydroxyprpycellulose as a Roller Compaction binder in Pharmaceutical Applications'. Drug Development & Indust. Pharm, 25(10), pp. 1121-1128, 1999.

The Fitzpatrick Company Europe N. V., 'Introduction to Roll Compaction and the Fitzpatrick Chilsonator'. Mar. 1997.

Sheskey, P., et al. 'Roll Compaction Granulation of a Controlled-Release Matrix Tablet Formulation Containing HPMC'. Pharmaceutical Technology, Oct. 1999.

Zhang, Y., et al., 'Physical Properties and Compact Analysis of Commonly Used Direct Compression Binders'. AAPS Pharm. Sci. Tech. 4 (4) Article 62, Dec. 15, 2003.

Hsiu-O, H. et al., 'Characteristics of Codried Products of Microcrystalline Cellulose with Saccharides and Low-substituted Hydroxypropylcellulose'. Powder Technology, 127 2002, pp. 45-53.

Gohel, M.C., 'A Review of Co-processed Directly Compressible Excipients'. Journal of Pharma, Pharma. Sci. 8(1), pp. 76-93, 2005.

Schroder, R. et al., 'Influence of Magnesium Stearate on the Compaction Behavior and Tablet characteristics of Co-Spray Dried Compounds vs Physical Blends'. Poster Presented at American Association of Pharmaceutical Science (Denver) Oct. 2001.

Jacob, S. et al. 'Novel Co-processed Excipients of Mannitol and Microcrystalline Cellulose for Preparing Fast Dissolving Tablets of Glipzide'. Indian Journal of Pharmaceutical Sciences, vol. 69 (5) Sep.-Oct. 2007, pp. 633-639.

Rowe, Sheskey & Weller, "Handbook of Pharmacuetical Excipients, Fourth Edition", 2003, Pharmaceutical Press, London. XP002281910, p. 110, col. 2.

* cited by examiner

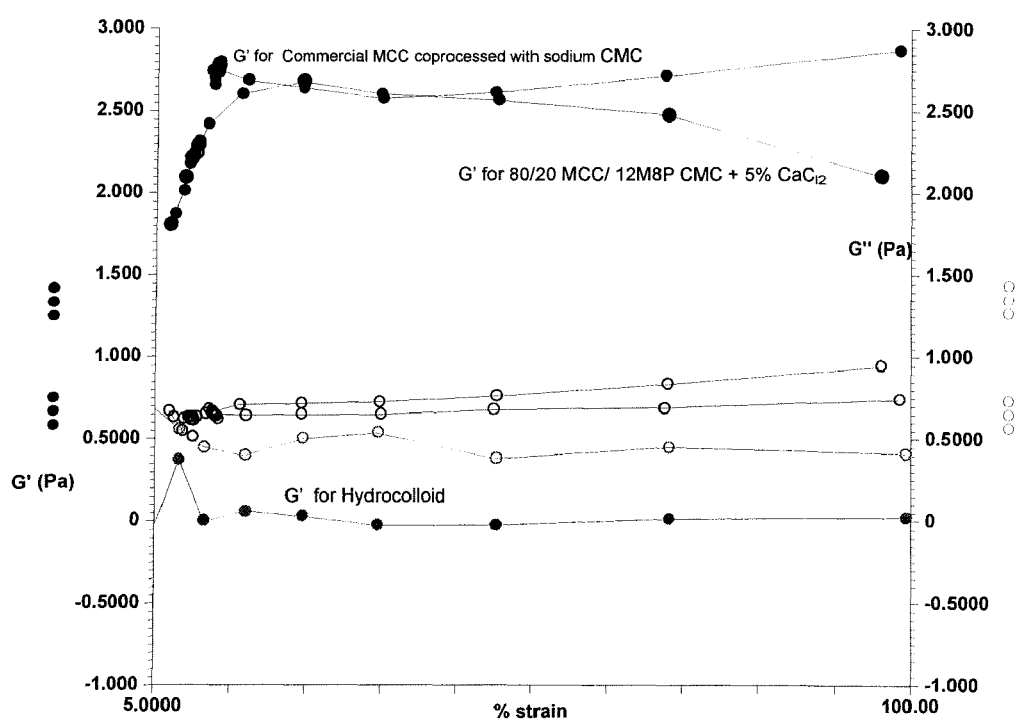
Figure 1 : Oscillatory Strain Sweep

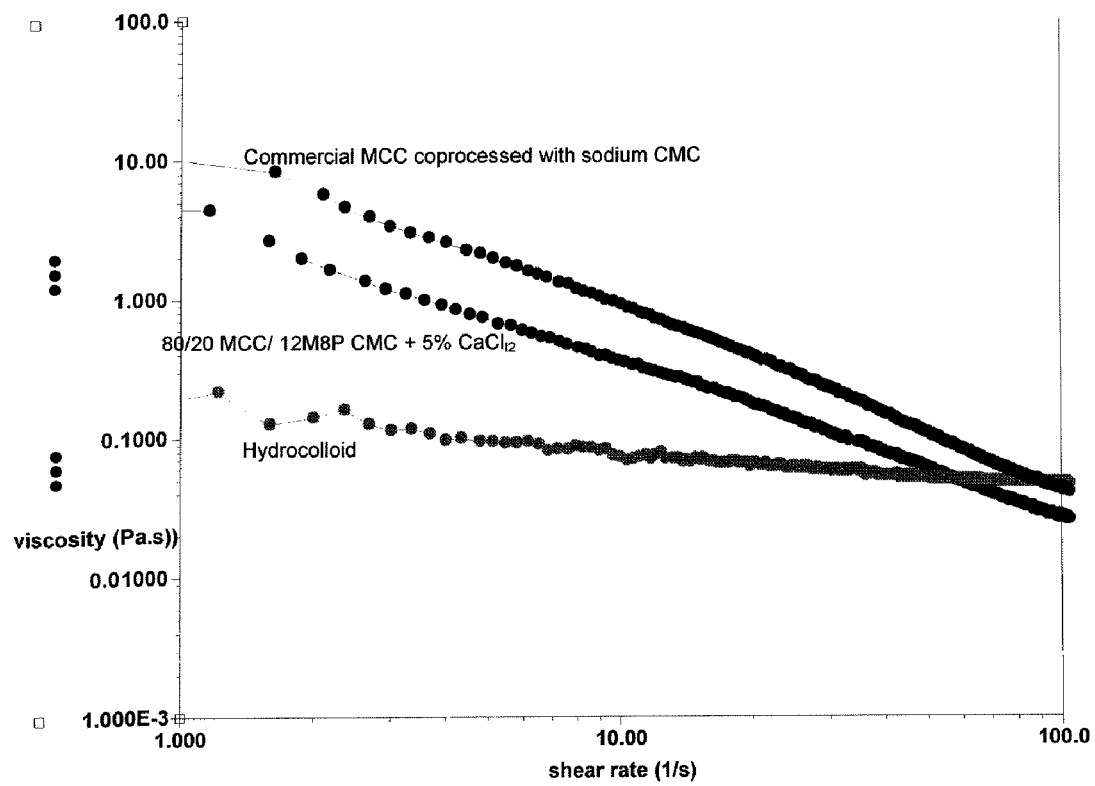
Figure 2: Viscosity Profile with Increasing Shear Rate

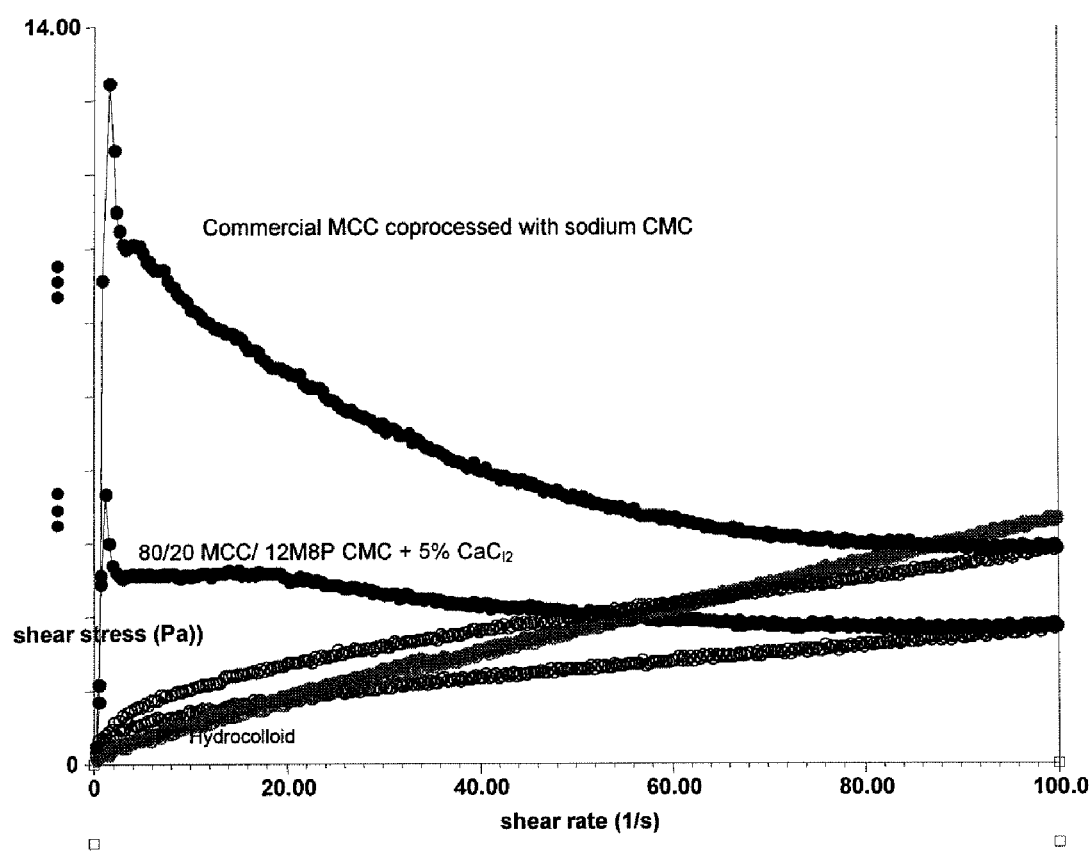
Figure 3: Thixotropy Profile vs shear rate

STABILIZERS AND COMPOSITIONS AND PRODUCTS COMPRISING SAME

CROSS REFERENCE TO RELATED APPLICATIONS

This application claims the benefit of U.S. application No. 60/722,720, filed Sep. 30, 2005; U.S. application No. 60/775,884;, filed Feb. 23, 2006; U.S. application No. 60/818,017, filed Jun. 30, 2006; and U.S. application No. 60/830,565, filed Jul. 13, 2006, each of which is incorporated herein in its entirety.

SUMMARY OF THE INVENTION

The current disclosure provides compositions that generally include microcrystalline cellulose, salt, and at least one water soluble cellulose ether. The cellulose ether can include those that have a degree of substitution that is about 0.6 to about 1.5. In some embodiments, the cellulose ether comprises an alkali metal carboxymethylcellulose. The microcrystalline cellulose and cellulose ether can be present in a weight ratio from about 50:50 to about 90:10, while the salt is present at a concentration of about 2% to about 6% by dry weight of the composition.

Further, edible food products are disclosed that are formed from the present compositions. The edible food products can additionally comprise diverse edible material and additives, including proteins, fruit juices, vegetable juices, fruit-flavored substances, or any combination thereof. In addition, a number of industrial suspensions are disclosed that comprise the present compositions that are adapted for use in a pharmaceutical, cosmetic, personal care product, agriculture product, or chemical formulation.

Also disclosed are methods for forming the compositions provided herein. The methods include mixing at least one water soluble cellulose ether with microcrystalline cellulose, wherein the weight ratio of the microcrystalline cellulose to the cellulose ether is about 50:50 to about 90:10. To this mixture, a salt solution is added to form a moist mixture. The moist mixture can be extruded to effect intimate mixing among the components and dispersed in water to form a slurry. The slurry can be homogenized and spray dried. Dry particles formed from the spray drying can be reconstituted in a desired aqueous medium or solution to form the compositions, edible food products, and industrial application suspensions described herein. The extruded mixture can be dried by processes other than spray drying, such as, for example, fluidized bed drying, drum drying, bulk drying, and flash drying.

Other features and advantages of the foregoing embodiments will be apparent from the following detailed description, and from the claims. The foregoing general description and detailed description of certain embodiments are exemplary and explanatory only and are not to be considered to be restrictive of the invention.

BRIEF DESCRIPTION OF THE DRAWINGS

FIG. 1 shows the elastic modulus (G') and loss modulus (G") of 1.5% dispersions of an 80:20 MCC/12M8P CMC and 5.0% $CaCl_2$ composition and a commercial colloidal microcrystalline cellulose co-processed with sodium carboxy methyl cellulose measured in the oscillatory mode using a Carri-Med rheometer as a function of increasing strain.

FIG. 2 shows the viscosity profile of 1.5% dispersions of an 80:20 MCC/12M8P CMC and 5.0% $CaCl_2$ composition and a commercial colloidal microcrystalline cellulose co-processed with sodium carboxy methyl cellulose measured using a Carri-Med rheometer as a function of increasing shear rate.

FIG. 3 shows the thixotropy profile and hysteresis of 1.5% dispersions of an 80:20 MCC/12M8P CMC and 5.0% $CaCl_2$ composition and a commercial colloidal microcrystalline cellulose co-processed with sodium carboxy methyl cellulose measured using a Carri-Med rheometer as a function of increasing shear rate and then decreasing shear rate.

DETAILED DESCRIPTION CERTAIN EMBODIMENTS

The present disclosure provides compositions that generally include microcrystalline cellulose ("MCC"), a salt, and at least one water soluble cellulose ether. The cellulose ether can be an alkali metal carboxymethylcellulose ("CMC"), which in some instances is sodium or potassium CMC, and preferably sodium CMC. The cellulose ethers contemplated for the present compositions have a degree of substitution of about 0.6 to about 1.5. In some embodiments, the cellulose ethers have a degree of substitution of 0.9 to 1.5. Still, in other embodiments, the cellulose ethers have a degree of substitution of 0.9 to 1.2. The quantities of MCC and cellulose ether incorporated into these compositions are such that the weight ratio of MCC:cellulose ether is about 50:50 to about 90:10. The compositions can be made so as to include a range of weight ratios of MCC:cellulose ether. In some embodiments the weight ratio of MCC:cellulose ether can be from 50:50 to 90:10. Other embodiments can have a weight ratio of MCC:cellulose ether from 75:25 to 82:18, while some embodiments have a weight ratio of about 70:30, about 80:20, or about 60:40.

Additionally, salt is present in the compositions at a concentration of about 2% to about 6% by dry weight of the composition. In some examples, the salt concentrations are about 3% to about 5% salt by dry weight of the composition. The salt is preferably a salt that includes a divalent cation, such as Ca or Mg. Some examples of salts contemplated for use in the disclosed compositions include calcium chloride, calcium lactate, calcium tartrate, calcium citrate, calcium maleate, calcium monophosphate, and magnesium chloride although others may also be used. In some embodiments, the salt is $CaCl_2$.

In some embodiments, the cellulose ether is methylcellulose, methylhydroxyethylcellulose, methylhydroxypropylcellulose, hydroxyethylcellulose, hydroxypropylcellulose, ethoxyhydroxyethylcellulose (EHEC), or a combination thereof. In some instances, the cellulose ether is methylcellulose, hydroxypropylmethylcellulose or hydroxypropylcellulose.

The cellulose ethers used to form the disclosed compositions are characterized by, inter alia, the degree of substitution that is present. The degree of substitution represents the average number of hydroxyl groups substituted per anhydroglucose unit. For example, in CMC, each anhydroglucose unit contains three hydroxyl groups, which gives CMC a maximum theoretical DS of 3.0. In one CMC example, Aqualon®, a commercial CMC embodiment, has a DS of 0.7, which is an average of 7 carboxymethyl groups per 10 anhydroglucose units.

Any MCC may be employed in the present compositions. Suitable feedstocks from which MCC may be obtained include, for example, wood pulp such as bleached sulfite and sulfate pulps, corn husks, bagasse, straw, cotton, cotton linters, flax, kemp, ramie, fermented cellulose, etc. In one embodiment, the MCC used is one approved for human consumption by the United States Food and Drug Administration.

The described compositions can act as stabilizers that have a multitude of industrial and consumer uses, e.g., in the food and beverage industry, or in suspensions for industrial application. The compositions, after drying to powder form, can be mixed with an aqueous solution to form a colloidal mix that, in some embodiments, can maintain its colloidal properties for greater periods of time and under more harsh conditions. Some of the edible food products formed using the compositions described herein provide stable colloidal properties for extended periods even at acidic pH conditions. Some examples of the edible food products include the following: sauces (especially low pH high salt types), retorted soups, dressings including both spoonable and pourable dressings, beverages including those that are heat treated, for example, by pasteurization or ultra pasteurization, or heat treated using ultra high temperature (UHT) or high temperature short time (HTST) or retort processes, UHT and retort processed protein and nutritional beverages, UHT processed low pH protein-based beverages, UHT Ca fortified beverages, UHT milk-based beverages, UHT and retort processed milk creams, low pH frozen desserts, e.g., fruit sherbets, aerated food systems dairy and non-dairy based, cultured products (sour cream, yogurts), bakery fillings or creams, such as fruit fillings, and whipped toppings. The levels of the compositions used in the contemplated food products can range from about 0.05% to about 3.5% by weight of total food product, and in some instances 0.2% to 2% by weight of total food product. In some of these edible food products, an adjunct stabilizer can be added to assist in long term stability, e.g., additional CMC can be added in the amounts of about 0.05% to about 0.5%.

In some embodiments, edible food products are provided that include the present compositions. These food products can also include other edible ingredients such as, for example, vegetable or fruit pulps, mineral salts, protein sources, fruit juices, acidulants, sweeteners, buffering agents, pH modifiers, stabilizing salts, or a combination thereof Those skilled in the art will recognize that any number of other edible components may also be added, for example, additional flavorings, colorings, preservatives, pH buffers, nutritional supplements, process aids, and the like. The additional edible ingredients can be soluble or insoluble, and, if insoluble, can be suspended in the food product. In some of the edible food products, the compositions are generally comprised of stabilizer, protein and/or fruit juice; e.g., fruit juices containing solids (such as pulp) and nectars are readily stabilized by adding the stabilizer compositions. In such blends having only juice or only protein, it will be recognized that the composition of the stabilizer composition and the amount of stabilizer composition used in the beverage blend may need to be adjusted accordingly to maintain the desired stability results. Such routine adjustment of the composition is fully within the capabilities of one having skill in the art and is within the scope and intent of the present invention. These edible food products can be, e.g, dry mix products (instant sauces, gravies, soups, instant cocoa drinks, etc.), low pH dairy systems (sour cream/yogurt, yogurt drinks, stabilized frozen yogurt, etc.), baked goods, as a bulking agent in non-aqueous food systems and in low moisture food systems.

Other products and applications for which the present compositions, or stabilizer compositions, may be used include industrial suspensions. In some embodiments, the industrial suspensions include the present compositions that are adapted for use in pharmaceuticals, cosmetics, personal care products, agricultural products, or chemical formulations. Some examples of industrial applications include excipients for chewable tablets, providing taste masking for drug actives such as APAP, aspirin, ibuprofen, etc.; suspending agents; controlled release agents in pharmaceutical applications; delivery systems for flavoring agents and nutraceutical ingredients in food, pharmaceutical, and agricultural applications; direct compression sustained release agents, which can be used as pharmaceutical dosage forms such as tablets, films, and suspensions; thickeners, which can be used in foams, creams, and lotions for personal care applications; suspending agents, which can be used with pigments and fillers in ceramics, colorants, cosmetics, and oral care; materials such as ceramics; delivery systems for pesticides including insecticides; and other agricultural products.

The use of a processing agent or agents may be desirable during preparation of the stabilizer composition. Examples of suitable salts include, but are not limited to, calcium chloride, calcium lactate, calcium tartrate, calcium citrate, calcium maleate, calcium monophosphate, and magnesium chloride. Other potential processing agents that are contemplated to be used for preparing the disclosed compositions include, for example, ammonium hydroxide, or buffering agents, such as, potassium carbonate, etc.

Suitable juices incorporating the stabilizer composition include fruit juices (including but not limited to lemon juice, lime juice, and orange juice, including variations such as lemonade, limeade, or orangeade, white and red grape juices, grapefruit juice, apple juice, pear juice, cranberry juice, blueberry juice, raspberry juice, cherry juice, pineapple juice, pomegranate juice, mango juice, apricot juice or nectar, strawberry juice, kiwi juice, and naranjadas) and vegetable juices (including but not limited to tomato juice, carrot juice, celery juice, beet juice, parsley juice, spinach juice, and lettuce juice). The juices may be in any form, including liquid, solid, or semi-solid forms such as gels or other concentrates, ices or sorbets, or powders, and may also contain suspended solids. In another embodiment, fruit-flavored or other sweetened substances, including naturally flavored, artificially flavored, or those with other natural flavors ("WONF"), may be used instead of fruit juice. Such fruit flavored substances may also be in the form of liquids, solids, or semi-solids, such as powders, gels or other concentrates, ices, or sorbets, and may also contain suspended solids.

Proteins suitable for the edible food products incorporating the stabilizer compositions include food proteins and amino acids, which can be beneficial to mammals, birds, reptiles, fish, and other living organisms. Food proteins include animal or plant proteins and fractions or derivatives thereof. Animal derived proteins include milk and milk derived products, such as heavy cream, light cream, whole milk, low fat milk, skim milk, fortified milk including protein fortified milk, processed milk and milk products including superheated and/or condensed, sweetened or unsweetened skin milk or whole milk, dried milk powders including whole milk powder and nonfat dry milk (NFDM), casein and caseinates, whey and whey derived products such as whey concentrate, delactosed whey, demineralized whey, whey protein isolate. Egg and egg-derived proteins may also be used. Plant derived proteins include nut and nut derived proteins, sorghum, legume and legume derived proteins such as soy and soy derived products such as untreated fresh soy, fluid soy, soy concentrate, soy isolate, soy flour, and rice proteins, and all forms and fractions thereof. Food proteins may be used in any available form, including liquid, condensed, or powdered. When using a powdered protein source, however, it may be desirable to prehydrate the protein source prior to blending with stabilizer compositions and juice for added stability of the resulting beverage. When protein is added in conjunction with a fruit or vegetable juice, the amount used will depend upon the desired end result. Typical amounts of protein range from about 1 to about 20 grams per 8 oz. serving of the resulting stable edible food products, such as beverages, but may be higher depending upon the application.

In certain embodiments, the compositions generally including microcrystalline cellulose, salt, and at least one water soluble cellulose ether are formulated as dry blends. At least one of an additional hydrocolloid, a surfactant, an active substance, and a filler can be added to the dry blends. In preferred embodiments, an additional hydrocolloid is added to the dry blends. The dry blends are suitable intermediates that can be dosed and dispersed with sufficient water and agitation with heat as appropriate to activate the stabilizer in the desired food, pharmaceutical, industrial, or cosmetic product or application.

In alternative embodiments, at least one of an additional hydrocolloid, a surfactant, an active substance, and a filler is added to a slurry generally including microcrystalline cellulose, salt, and at least one water soluble cellulose ether, and the slurry is then spray dried.

Suitable additional hydrocolloids include, but are not limited to, water soluble and water dispersible gums, polysaccharides, and synthetic polymers, such as, for example, pectins, including high methoxyl ("HM") and low methoxyl pectins and acetylated pectins, such as beet pectin, carboxy methyl cellulose ("CMC"), high degree-of-substitution ("high DS") carboxy methyl cellulose ("CMC"), alginate, karaya gum, xanthan gum, arabic gum, gellan gum, PGA, carrageenan, tragacanth, starch, galactomannans, such as guar gum, locust bean gum, tara gum, cassia gum, and mixtures thereof. In some embodiments, the additional hydrocolloid is xanthan gum, starch, high DS CMC, or pectin.

The additional hydrocolloids can be employed in a number of ways. In certain embodiments, an additional hydrocolloid is added to the dry blend or to the slurry during production of the stabilizer compositions described herein. For example, the hydrocolloid is added to the slurry just prior to spray drying, so that the entire mixture is spray-dried at once. The resulting dry mixture of the stabilizer composition plus an additional hydrocolloid may then be packaged and stored, and added as a single measure during production of the food, pharmaceutical, industrial, or cosmetic products described herein.

In alternative embodiments, the additional hydrocolloid is added in a supplementary step at the time of production, in an amount suited to the particular product being manufactured.

The additional hydrocolloids are employed in amounts sufficient to enhance the stabilizing function of the MCC/cellulose ether and salt compositions in the final food, pharmaceutical, industrial, or cosmetic product. For example, in a beverage, an adjunct stabilizer can be employed in a sufficient amount to reduce serum separation in the final beverage.

Suitable surfactants include, but are not limited to, ionic or nonionic with an HLB of 1 to 40.

Active substances include, but are not limited to, at least one of a nutraceutical agent, a vitamin, a mineral, a coloring agent, a sweetener, a flavorant, a fragrance, a salivary stimulant agent, a food, an oral care agent, a breath freshening agent, a pharmaceutical active, agricultural active, therapeutic agent, cosmetic agent, chemical, buffer, or pH modifier. Active substances can be encapsulated or otherwise processed or treated to modify their release properties.

The particular filler used depends upon its ability to modify the blend and/or the desired product. Insoluble fillers, such as pigments like titanium dioxide, and insoluble but swellable fillers, such as gel particles, celluloses or microcrystalline cellulose, form suspensions or dispersions with the activated stabilizer. Alternatively, fillers can be water-soluble and capable of readily dissolving in water, such as sugar or maltodextrin, or reactive, for example, pH sensitive or temperature sensitive, and capable of dissolving under specific process conditions, such as calcium carbonate.

When manufacturing edible products or beverages having a low-pH phase and a protein phase it is also possible to achieve a desirable level of stability by manufacturing edible products or beverages in a single phase. In such a single-phase process, the stabilizer composition and optional additional hydrocolloid may be dispersed in water. Additional ingredients, including but not limited to proteins, fruit juices, acidulants, buffers, sweeteners, pH modifiers, antifoaming agents, and salts may then be added to the present compositions in a single phase. The order of addition of any additional ingredients should be selected to insure protein protection both during assembly of the edible product or beverage and thereafter.

Additional ingredients may be added to the edible compositions, or edible food products, disclosed herein. Such additional ingredients which may be desirable and can include, but are not limited to, pH modifiers such as acidulants (including citric, malic, tartaric, phosphoric, acetic, and lactic acids and the like), buffering agents (including carbonates, citrates, phosphates, sulfates, maleates, and the like), or the like that may be added to either the juice or protein components at any stage of production, sweeteners (such as sugar, corn syrup, fructose, etc), high intensity sweeteners (such as aspartame), sweetener alternatives (such as sucralose) or sugar alcohols (such as sorbitol, mannitol, and maltitol). In one embodiment, a sugar alternative such as sucralose, aspartame, or acesulfame K is used to produce a resulting composition that is low in carbohydrate content. Further possible additives include flavors, colorants, emulsifiers, preservatives, fillers such as maltodextrins, alcohol compositions, concentrates, and nutritional additives (such as calcium, i.e. calcium maleate or other minerals, vitamins, herbal supplements, etc.). Optional process aids such as an antifoam agent may also be used in these applications.

Many of the edible food products disclosed herein can benefit from the stabilizer compositions, which are the edible food products that include low pH liquids, wherein the resulting pH is greater than about 2.5 and less than about 7.0. In one embodiment, the pH of the food product is between about 2.8 and about 6.5. In a further embodiment, the pH of the food product is between about 3.0 and about 6.0. The pH can also be less than about 5.5. The compositions can be either alcoholic or non-alcoholic in nature.

The final beverage compositions may be processed by heat treatment in any number of ways. These methods may include, but are not limited to, pasteurization, ultra pasteurization, high temperature short time pasteurization ("HTST"), and ultra high temperature pasteurization ("UHT"). These beverage compositions may also be retort processed, either by rotary retort or static retort processing. Some compositions, such as juice-added or natural or artificially flavored soft drinks may also be cold processed. Many of these processes may also incorporate homogenization or other shearing methods. There may also be co-dried compositions, which can be prepared in dry-mix form, and then conveniently reconstituted for consumption as needed. The resulting beverage compositions may be refrigerated and stored for a commercially acceptable period of time. In the alternative, the resulting beverages may be stored at room temperature, provided they are filled under aseptic conditions.

In some embodiments, the disclosed edible food products have enhanced storage stability and, therefore, greater commercial appeal. Stable compositions are those that exhibit acceptable levels of storage stability. Storage stability is intended to mean at least one or more of the following product characteristics over the desired shelf life of the product: in liquid systems—suspension with minimal or no sedimentation, minimal or no serum separation, minimal or no creaming, minimal or no mottling, absence of rippling, absence of localized gels or gelation; in solid, semi-solid, gel, foam or film systems—minimal or no serum separation, deaeration or coalescence; and additionally for frozen systems—reduction or avoidance of the growth in size or number of ice crystals. As used in the foregoing description, minimal sedimentation means that any sediment that exists is present as loose sediment, which may be easily shaken back into the system. As used in the foregoing description, minimal serum separation means that less than 5 mm of serum is present when the liquid system is viewed in a 250 mL flask. In some embodiments, the edible food products can have enhanced storage ability without the need for adjunct stabilizers (outside of cellulose ethers used in compositions). For example, some sauces that lack an adjunct stabilizer, such as xanthan gum, are shown to maintain relative viscosity for extended periods of time, which in some instances is over 1 year, or in some instances is over 6 months.

Bakery fillings, such as fruit fillings, that comprise the present compositions exhibit a wide range of textures and flow. Flow is also referred to as spread. Spread or flow measures the ability of a fruit filling preparation to retain its initial shape and volume after being baked for a defined amount of time at a given temperature. A defined volume of fruit filling preparation, such as, for example, approximately 35 g, is placed in a 3.5 cm diameter by 0.8 cm high ring centered on paper that has been marked with concentric circles to facilitate reading the test. The fruit filling is leveled to the top of the ring and the ring is removed. The fruit filling and paper are placed on a cookie sheet and baked for 10 minutes at 400° F. in a ventilated oven. The spread is measured by determining the difference between the final diameter after baking and the initial diameter before baking, then dividing by the initial diameter and converting to a percentage.

The force required to break the baked fruit filing can be measured using a 0.5 inch radius Delrin probe with the TA-TX2 texture analyzer (Stable Micro Systems Ltd).

EXAMPLES

The invention is further demonstrated in the following examples. The examples are for purposes of illustration and are not intended to limit the scope of the present invention.

Example 1

80/20 MCC/12M8P CMC with 5.0% $CaCl_2$

In a 5 gal Hobart mixer, 908.7 grams of microcrystalline cellulose (MCC) wetcake was admixed with 105.3 grams Aqualon® 12M8P CMC to obtain an MCC to CMC solids ratio of 80/20 parts by weight. 83.3 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery, thereby enabling it to be subjected to a high work profile which facilitated the formation of colloidal microcrystalline cellulose particles.

329.18 grams of the MCC/CMC extrudate was dispersed in 2670.82 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. A colloidal content of 81.70% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 2,300 cps and a viscosity of 2,800 cps when retested after 24 hours, suggesting an effective interaction that is a good gel network between the MCC and the 12M8P CMC.

Example 2

80/20 MCC/12M8P CMC with 5.0% $CaCl_2$

In a 5 gal Hobart mixer, 1090.4 grams of microcrystalline cellulose (MCC) wetcake was admixed with 126.3 grams of a second lot of Aqualon® 12M8P CMC to obtain an MCC to CMC solids ratio of 80/20 parts by weight. 100.0 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery, thereby enabling it to be subjected to a high work profile, which facilitated the formation of colloidal microcrystalline cellulose particles.

329.18 grams of the MCC/CMC extrudate was dispersed in 2670.82 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. A colloidal content of 88.83% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 1450 cps and a viscosity of 1825 cps when retested after 24 hours, suggesting an effective interaction that is a good gel network between the MCC and the 12M8P CMC.

Example 3

80/20 MCC/12M8P CMC with 4.0% $CaCl_2$

In a 5 gal Hobart mixer, 1101. 9 grams of microcrystalline cellulose (MCC) wetcake was admixed with 127.6 grams Aqualon® 12M8P CMC to obtain an MCC to CMC solids ratio of 80/20 parts by weight. 80.0 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery, thereby enabling it to be subjected to a high work profile, which facilitated the formation of colloidal microcrystalline cellulose particles.

327.38 grams of the MCC/CMC extrudate was dispersed in 2672.62 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. A colloidal content of 82.90% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 1350 cps and a viscosity of 1750 cps when retested after 24 hours, suggesting an effective interaction that is a good gel network between the MCC and the CMC.

Example 4

60/40 MCC/12M8P CMC with 5.0% $CaCl_2$

In a 5 gal Hobart mixer, 817.8 grams of microcrystalline cellulose (MCC) wetcake was admixed with 252.6 grams Aqualon® 12M8P CMC to obtain an MCC to CMC solids ratio of 60/40 parts by weight. 100 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery, thereby enabling it to be subjected to a high work profile, which facilitated the formation of colloidal microcrystalline cellulose particles.

292.61 grams of the MCC/12M8P CMC extrudate was dispersed in 2707.39 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. A colloidal content of 77.42% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 500 cps and a viscosity of 2125 cps when retested after 24 hours, suggesting an effective interaction that is a good gel network between the MCC and the 12M8P CMC.

Example 5

60/40 MCC/12M8P CMC with 4.0% $CaCl_2$

In a 5 gal Hobart mixer, 826.4 grams of microcrystalline cellulose (MCC) wetcake was admixed with 255.3 grams Aqualon® 12M8P CMC to obtain an MCC to CMC solids ratio of 60/40 parts by weight. 80 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery, thereby enabling it to be subjected to a high work profile, which facilitated the formation of colloidal microcrystalline cellulose particles.

290.42 grams of the MCC/CMC extrudate was dispersed in 2709.58 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. A colloidal content of 69.24% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 275 cps and a viscosity of 1900 cps when retested after 24 hours, suggesting an effective interaction that is a good gel network between the MCC and the 12M8P CMC.

Example 6

60/40 MCC/12M8P CMC with 3.0% $CaCl_2$

In a 5 gal Hobart mixer, 835.0 grams of microcrystalline cellulose (MCC) wetcake was admixed with 258.0 grams Aqualon® 12M8P CMC to obtain an MCC to CMC solids ratio of 60/40 parts by weight. 60 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery, thereby enabling it to be subjected to a high work profile, which facilitated the formation of colloidal microcrystalline cellulose particles.

288.24 grams of the MCC/12M8P CMC extrudate was dispersed in 2711.76 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. A colloidal content of 63.87% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 150 cps and a viscosity of 1350 cps when retested after 24 hours, suggesting an effective interaction that is a good gel network between the MCC and the 12M8P CMC.

Example 7

80/20 MCC/12M31P CMC with 5.0% $CaCl_2$

In a 5 gal Hobart mixer, 908.7 grams of microcrystalline cellulose (MCC) wetcake was admixed with 104.6 grams Aqualon® 12M31P CMC to obtain an MCC to CMC solids ratio of 80/20 parts by weight. 83.3 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

328.98 grams of the MCC/12M31P CMC extrudate was dispersed in 2671.02 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. A colloidal content of 87.22% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 2,800 cps and a viscosity of 3,200 cps when retested after 24 hours, suggesting an effective interaction that is a good gel network between the MCC and the 12M31P CMC.

Example 8

80/20 MCC/12M31P CMC with 3.0% $CaCl_2$

In a 5 gal Hobart mixer, 1113.3 grams of microcrystalline cellulose (MCC) wetcake was admixed with 128.2 grams of 12M31P CMC to obtain an MCC to CMC solids ratio of 80/20 parts by weight. 60.0 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

325.38 grams of the MCC/12M31P CMC extrudate was dispersed in 2674.62 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./100° F. The spray drying conditions were regulated depending upon feed properties such as viscosity and resulting dried product characteristics and subsequent yield.

A water dispersible colloidal MCC powder was obtained. A colloidal content of 90.53% was obtained. When dispersed in deionized water, its 2.6% dispersion exhibited an initial Brookfield viscosity of 2,050 cps and a viscosity of 2,775 cps when retested after 24 hours suggesting an effective interaction that is a good gel network between the MCC and the 12M31P.

Example 9

80/20 MCC/HP-1050B CMC with 5.0% $CaCl_2$

In a 5 gal Hobart mixer, 1817.3 grams of microcrystalline cellulose (MCC) wetcake was admixed with 202.2 grams Cellogen® HP-1050B CMC to obtain an MCC to CMC solids ratio of 80/20 parts by weight. 166.7 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

327.92 grams of the MCC/HP-1050B CMC extrudate was dispersed in 2672.92 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. A colloidal content of 87.04% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 4,075 cps and a viscosity of 6,100 cps when retested after 24 hours, suggesting an effective interaction that is a good gel network between the MCC and the HP-1050B CMC.

Example 10

80/20 MCC/HP-1050B CMC with 4.0% $CaCl_2$

In a 5 gal Hobart mixer, 1101.9 grams of microcrystalline cellulose (MCC) wetcake was admixed with 122.6 grams HP-1050B CMC to obtain an MCC to CMC solids ratio of 80/20 parts by weight. 80 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

326.11 grams of the MCC/HP-1050B CMC extrudate was dispersed in 2673.89 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. A colloidal content of 84.91% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 4100 cps and a viscosity of 5800 cps when retested after 24 hours, suggesting an effective interaction that is a good gel network between the MCC and the HP-1050B CMC.

Example 11

80/20 MCC/HP1215C CMC with 4.0% $CaCl_2$

In a 5 gal Hobart mixer, 1101.9 grams of microcrystalline cellulose (MCC) wetcake was admixed with 121.9 grams HP1215C CMC to obtain an MCC to CMC solids ratio of 80/20 parts by weight. 80.0 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

325.94 grams of the MCC/HP1215C CMC extrudate was dispersed in 2674.06 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./90° F. The spray drying conditions were regulated depending upon feed properties such as viscosity and resulting dried product characteristics and subsequent yield.

A water dispersible colloidal MCC powder was obtained. A colloidal content of 91.14% was obtained. When dispersed in deionized water, its 2.6% dispersion exhibited an initial Brookfield viscosity of 2,000 cps and a viscosity of 2,525 cps when retested after 24 hours suggesting an effective interaction that is a good gel network between the MCC and the HP1215C.

Example 12

80/20 MCC/Akzo 1.1 CMC with 5.0% $CaCl_2$

In a 5 gal Hobart mixer, 908.7 grams of microcrystalline cellulose (MCC) wetcake was admixed with 102.4 grams Akzo 1.1 CMC to obtain an MCC to CMC solids ratio of 80/20 parts by weight. 83.3 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

328.31 grams of the MCC/Akzo 1.1 CMC extrudate was dispersed in 2671.69 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. A colloidal content of 85.55% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 1,825 cps and a viscosity of 3,325 cps when retested after 24 hours, suggesting an effective interaction that is a good gel network between the MCC and the Akzo 1.1 CMC.

Example 13

80/20 MCC/Akzo 1.2 CMC with 5.0% $CaCl_2$

In a 5 gal Hobart mixer, 908.7 grams of microcrystalline cellulose (MCC) wetcake was admixed with 101.1 grams Akzo 1.2 CMC to obtain an MCC to CMC solids ratio of 80/20 parts by weight. 83.3 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

327.93 grams of the MCC/Akzo 1.2 CMC extrudate was dispersed in 2672.07 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225°

F./125° F. The spray drying conditions were regulated depending upon feed properties such as viscosity and resulting dried product characteristics and subsequent yield.

A water dispersible colloidal MCC powder was obtained. A colloidal content of 83.45% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 1,600 cps and a viscosity of 2,050 cps when retested after 24 hours, suggesting an effective interaction that is a good gel network between the MCC and the Akzo 1.2 CMC.

Example 14

80/20 MCC/Akzo 1.2 with 5.0% $CaCl_2$

In a 5 gal Hobart mixer, 1090.4 grams of microcrystalline cellulose (MCC) wetcake was admixed with 121.3 grams Akzo 1.2 CMC to obtain an MCC to CMC solids ratio of 80/20 parts by weight. 100 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

327.93 grams of the MCC/Akzo 1.2 CMC extrudate was dispersed in 2672.07 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. A colloidal content of 87.78% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 700 cps and a viscosity of 1300 cps when retested after 24 hours, suggesting an effective interaction that is a good gel network between the MCC and the Akzo 1.2 CMC.

Example 15

80/20 MCC/Akzo 1.2 CMC with 4.0% $CaCl_2$

In a 5 gal Hobart mixer, 1101.9 grams of microcrystalline cellulose (MCC) wetcake was admixed with 122.6 grams Akzo 1.2 CMC to obtain an MCC to CMC solids ratio of 80/20 parts by weight. 80 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

326.12 grams of the MCC/Akzo 1.2 CMC extrudate was dispersed in 2673.88 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. A colloidal content of 91.67% was obtained. The colloidal content was determined by centrifugation at 8250 rpm for 15 minutes followed by gravimetric analysis of the dried supernatant product. When dispersed in deionized water, its 2.6% dispersion exhibited an initial Brookfield viscosity of 1475 cps and a viscosity of 2325 cps when retested after 24 hours, suggesting an effective interaction that is a good gel network between the MCC and the Akzo 1.2 CMC.

Example 16

80/20 MCC/Akzo 1.3DS High Viscosity CMC with 4.0% $CaCl_2$

In a 5 gal Hobart mixer, 1101.9 grams of microcrystalline cellulose (MCC) wetcake was admixed with 117.8 grams Akzo 1.3DS High Viscosity CMC to obtain an MCC to CMC solids ratio of 80/20 parts by weight. 80.0 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

324.92 grams of the MCC/Akzo 1.3DS High Viscosity CMC extrudate was dispersed in 2675.08 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./100° F. The spray drying conditions were regulated depending upon feed properties such as viscosity and resulting dried product characteristics and subsequent yield.

A water dispersible colloidal MCC powder was obtained. A colloidal content of 93.80% was obtained. When dispersed in deionized water, its 2.6% dispersion exhibited an initial Brookfield viscosity of 4,600 cps and a viscosity of 8,000 cps when retested after 24 hours suggesting an effective interaction that is, a good gel network between the MCC and the Akzo 1.3DS High Viscosity CMC.

Example 17

80/20 MCC/9H4F CMC with 4.0% $CaCl_2$

In a 5 gal Hobart mixer, 1101.9 grams of microcrystalline cellulose (MCC) wetcake was admixed with 129.2 grams 9H4F CMC to obtain an MCC to CMC solids ratio of 80/20 parts by weight. 80.0 grams of a 30% solution of $CaCl_2$ was added and mixed for several minutes. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

327.76 grams of the MCC/9H4F CMC extrudate was dispersed in 2672.24 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./100° F. The spray drying conditions were regulated depending upon feed properties such as viscosity and resulting dried product characteristics and subsequent yield.

A water dispersible colloidal MCC powder was obtained. When dispersed in deionized water, its 2.6% dispersion exhibited an initial Brookfield viscosity of 2,500 cps and a viscosity of 5,800 cps when retested after 24 hours suggesting an effective interaction that is a good gel network between the MCC and the 9H4F.

Example 18

Low pH Beverage

Samples were prepared using 0.4% of an 80:20 MCC/12M8P CMC and 5.0% $CaCl_2$ composition with 0.5% of added Aqualon® 12M8P CMC.

| Formulation @ 5.6 g protein/8 oz serving | % by wt. |
| --- | --- |
| Sugar | 7.00% |
| Citric Acid | 0.55% |
| MCC/12M8P CMC (80:20) and 5.0% $CaCl_2$ | 0.4% |
| 12M8P CMC | 0.5% |
| Orange Juice Concentrate | 5.00% |
| Water | 26.55% |
| Whole Milk (3% fat) | 15.0% |
| Skim Milk | 45.0% |

A dry blend was prepared of the following ingredients: sugar, the 80:20 MCC/12M8P CMC with 5.0% $CaCl_2$ stabilizer, CMC, and citric acid. The juice and water were added to a vessel and the dry blend was slowly added to the juice/water while mixing. The fruit juice mixture was then stirred for 5 minutes. The milk was added to a second vessel. The fruit juice mixture was then slowly added to milk with stirring and mixed for 10 minutes. The product was first cold (50-60° F.) homogenized with an APV homogenizer at a two-stage pressure of 2500 psi (2000 psi, 500 psi) and then pasteurized at 185° F. for 20 seconds. The product was cooled to 59° F. and filled into bottles. The product had a pH of 4.0 and Brookfield viscosity of 27 cP (LV viscometer, #1 spindle, 60 rpm). The sample was stable for 4 weeks at refrigerated conditions (4° C.) with no sediment observed after one month and a slight sediment (about 1 to 2 mm) was observed after 2 months.

Example 19

Low pH Beverage

Samples were prepared using 0.4% of an 80:20 MCC/12M8P CMC and 5.0% $CaCl_2$ composition with 0.35% of added Aqualon® 12M8P CMC.

| Formulation @ 3.5 g protein/8 oz serving | % by wt. |
| --- | --- |
| OJ concentrate | 4.21% |
| Sugar | 8.00% |
| Skim Milk | 20.00% |
| Nonfat Dry Milk | 1.73% |
| Citric Acid | 0.25% |
| MCC/12M8P CMC (80:20) and 5.0% $CaCl_2$ | 0.4% |
| 12M8P CMC | 0.35% |
| Water | to 100% |

The 80:20 MCC/12M8P CMC with 5.0% $CaCl_2$ powder was dispersed in water at 145-150° F. and mixed for 15 minutes. Additional 12M8P CMC was then added and mixed until hydrated, or for approximately 10 minutes. Milk and NFDM were added and the product was then mixed for an additional 20 minutes while still maintaining a temperature between 145-150° F. The product was then cooled to 100-110° F. The orange juice concentrate and citric acid (50/50 blend with DI water) were then added and mixed for 5 minutes. An antifoam agent (Hi-Mar S-030-FG at 0.1-0.2%) was then added, and adjustments were then made, if needed, for any water loss. Using a Microthermics UHT/HTST with in-line Niro-Soavi homogenizer, the product was then pasteurized at 195° F. for 15 seconds, cooled to 165° F. and homogenized in two stages at 2500 psi (2000 psi, 500 psi). Finally, the mixture was cooled to 20° C. and filled. The product had a pH of 4.41 and viscosity of 27.8 cP and was stable for 8 weeks with no serum separation and no sediment.

Example 20

Low pH Beverage

Samples were prepared using 0.4% of an 80:20 MCC/12M8P CMC and 5.0% $CaCl_2$ composition with 0.25% of added Aqualon® 12M8P CMC.

| Formulation @ 3.5 g protein/8 oz serving | % by wt. |
| --- | --- |
| OJ concentrate | 4.21% |
| Sugar | 8.00% |
| Skim Milk | 20.00% |
| Nonfat Dry Milk | 1.73% |
| Citric Acid | 0.25% |
| MCC/12M8P CMC (80:20) and 5.0% $CaCl_2$ | 0.4% |
| 12M8P CMC | 0.25% |
| Water | to 100% |

The 80:20 MCC/12M8P CMC with 5.0% $CaCl_2$ powder was dispersed in water at 145-150° F. and mixed for 15 minutes. Additional 12M8P CMC was then added and mixed until hydrated, or for approximately 10 minutes. Milk and NFDM were added and the product was then mixed for an additional 20 minutes while still maintaining a temperature between 145-150° F. The product was then cooled to 100-110° F. The orange juice concentrate and citric acid (50/50 blend with DI water) were then added and mixed for 5 minutes. An antifoam agent (Hi-Mar S-030-FG at 0.1-0.2%) was then added, and adjustments were then made, if needed, for any water loss. Using a Microthermics UHT/HTST with in-line Niro-Soavi homogenizer, the product was then pasteurized at 195° F. for 15 seconds, cooled to 165° F. and homogenized in two stages at 2500 psi (2000 psi, 500 psi). Finally, the mixture was cooled to 20° C. and filled. The product had a pH of 4.33 and viscosity of 14.6 cP and was stable for 8 weeks with no serum separation and no sediment.

Example 21

Low pH Beverage

Samples were prepared using 0.4% of an 80:20 MCC/12M8P CMC and 5.0% $CaCl_2$ composition with 0.25% of added Aqualon® 12M8P CMC.

| Formulation @ 4.75 g protein/8 oz serving | % by wt. |
|---|---|
| OJ concentrate | 4.21% |
| Sugar | 8.00% |
| Skim Milk | 20.00% |
| Nonfat Dry Milk | 3.38% |
| Citric Acid | 0.25% |
| MCC/12M8P CMC (80:20) and 5.0% $CaCl_2$ | 0.4% |
| 12M8P CMC | 0.25% |
| Water | to 100% |

The 80:20 MCC/12M8P CMC with 5.0% $CaCl_2$ powder was dispersed in water at 145-150° F. and mixed for 15 minutes. Additional 12M8P CMC was then added and mixed until hydrated, or for approximately 10 minutes. Milk and NFDM were added and the product was then mixed for an additional 20 minutes while still maintaining a temperature between 145-150° F. The product was then cooled to 100-110° F. The orange juice concentrate and citric acid (50/50 blend with DI water) were then added and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.85 and viscosity of 32.2 cP and was stable for 4 weeks with no serum separation and trace to no sediment.

Example 22

Low pH Beverage

Samples were prepared using 0.4% of an 80:20 MCC/12M8P CMC and 5.0% $CaCl_2$ composition with 0.15% of added Aqualon® 12M8P CMC.

| Formulation @ 1.8 g protein/8 oz serving | % by wt. |
|---|---|
| OJ concentrate | 4.21% |
| Sugar | 8.00% |
| Skim Milk | 21.73% |
| Citric Acid | 0.25% |
| MCC/12M8P CMC (80:20) and 5.0% $CaCl_2$ | 0.4% |
| 12M8P CMC | 0.15% |
| Water | to 100% |

The 80:20 MCC/12M8P CMC with 5.0% $CaCl_2$ powder was dispersed in water at 145-150° F. and mixed for 15 minutes. Additional 12M8P CMC was then added and mixed until hydrated, or for approximately 10 minutes. Milk was added and the product was then mixed for an additional 20 minutes while still maintaining a temperature between 145-150° F. The product was then cooled to 100-110° F. The orange juice concentrate and citric acid (50/50 blend with DI water) were then added and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.07 and viscosity of 24.0 cP and was stable for 6 weeks with 5 mm serum separation and no sediment.

Example 23

Low pH Beverage

Samples were prepared using 0.4% of an 80:20 MCC/12M8P CMC and 5.0% $CaCl_2$ composition with 0.5% of added Aqualon® 12M8P CMC.

| Formulation @ 6.5 g protein/8 oz serving | % by wt. |
|---|---|
| OJ concentrate | 4.21% |
| Sugar | 8.00% |
| Skim Milk | 20.00% |
| Nonfat Dry Milk | 5.03% |
| Citric Acid | 0.35% |
| MCC/12M8P CMC (80:20) and 5.0% $CaCl_2$ | 0.4% |
| 12M8P CMC | 0.5% |
| Water | to 100% |

The 80:20 MCC/12M8P CMC with 5.0% $CaCl_2$ powder was dry mixed with the 12M8P and added in water at 145-150° F. and mixed for 25 minutes. Milk and NFDM were added and the product was then mixed for an additional 20 minutes while still maintaining a temperature between 145-150° F. The product was then cooled to 100-110° F. The orange juice concentrate and citric acid (50/50 blend with DI water) were then added and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.43 and viscosity of 33.5 cP and was stable for 6 weeks with no serum separation and no sediment.

Example 24

Low pH Beverage

Samples were prepared using 0.5% of an 80:20 MCC/12M8P CMC and 5.0% $CaCl_2$ composition with 0.6% of added Aqualon® 12M8P CMC.

| Formulation @ 7.5 g protein/8 oz serving | % by wt. |
|---|---|
| Apple Juice conc. (38.5 brix) | 4.50 |
| Sugar | 8.00 |
| Soy Protein Isolate XT 40N | 3.00 |
| Tricalcium Phosphate | 0.10 |
| MCC/12M8P CMC (80:20) and 5.0% $CaCl_2$ | 0.50 |
| 12M8P CMC | 0.60 |
| Citric acid | 0.56 |
| Water | to 100% |

The soy protein isolate was added to 80% of the available water at 155-160° F. and mixed for 15 minutes. Then, the dry mixed sugar and TCP was added and mixed an additional 5 minutes. Next, the 80:20 MCC/12M8P CMC with 5.0% $CaCl_2$ powder was dispersed in the mixture while maintaining the temperature of 155-160° F. and mixed for 15 minutes. Additional 12M8P CMC was then added and mixed until hydrated, or for approximately 10 minutes. The product was then cooled to 100-110° F. The juice concentrate and citric acid was then diluted in the remaining available water and added to the formulation and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.17 and viscosity of 38.0 cP and was stable for 6 weeks with no serum separation and no sediment.

Example 25

Low pH Beverage

Samples were prepared using 0.4% of an 80:20 MCC/12M8P CMC and 5.0% $CaCl_2$ composition with 0.35% of added AMD 783 Danisco HM Pectin.

| Formulation @ 7.5 g protein/8 oz serving | % by wt. |
|---|---|
| Sugar | 9.00 |
| Whey Protein Isolate Bi Pro | 3.00 |
| Tricalcium phosphate | 0.32 |
| MCC/12M8P CMC (80:20) and 5.0% $CaCl_2$ | 0.40 |
| HM Pectin | 0.35 |
| Citric acid | 0.50 |
| Water | to 100% |

The 80:20 MCC/12M8P CMC with 5.0% $CaCl_2$ powder was dispersed in 80% of the available water at 145-150° F. and mixed for 15 minutes. Additional AMD 783 HM pectin was then added and mixed until hydrated, or for approximately 10 minutes. The whey protein isolate was then added and mixed for 15 minutes. Then, the dry mixed sugar and TCP were added and mixed an additional 5 minutes. The product was then cooled to 100-110° F. The citric acid was then diluted in the remaining available water and added to the formulation and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.26 and viscosity of 14.5 cP and was stable for 4 weeks with trace serum separation and no sediment.

Example 26

Low pH Beverage

Samples were prepared using 0.75% of a 60:40 MCC/12M8P CMC and 3.0% $CaCl_2$ composition at a lower protein level.

| Formulations @ 3.5 g protein/8 oz serving | % by wt. |
|---|---|
| OJ concentrate | 4.21% |
| Sugar | 8.00% |
| Skim Milk | 20.00% |
| Nonfat Dry Milk | 1.73% |
| Citric Acid | 0.25% |
| MCC/12M8P CMC (60:40) and 3.0% $CaCl_2$ | 0.75% |
| Water | to 100% |

The 60:40 MCC/12M8P CMC with 3.0% $CaCl_2$ powder was dispersed in water at 145-150° F. and mixed for 15 minutes. Milk and NFDM were added and the product was then mixed for an additional 20 minutes while still maintaining a temperature between 145-150° F. The product was then cooled to 100-110° F. The orange juice concentrate and citric acid (50/50 blend with DI water) were then added and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.28 and viscosity of 13.5 cP and was stable for 4 weeks with no serum separation and no sediment.

Example 27

Low pH Beverage

Samples were prepared using 0.75% of a 60:40 MCC/12M8P CMC and 3.0% $CaCl_2$ composition at a medium protein level.

| Formulation @ 4.75 g protein/8 oz serving | % by wt. |
|---|---|
| OJ concentrate | 4.21% |
| Sugar | 8.00% |
| Skim Milk | 20.00% |
| Nonfat Dry Milk | 3.38% |

-continued

| Formulation @ 4.75 g protein/8 oz serving | % by wt. |
|---|---|
| Citric Acid | 0.25% |
| MCC/12M8P CMC (60:40) and 3.0% CaCl$_2$ | 0.75% |
| Water | to 100% |

The 60:40 MCC/12M8P CMC with 3.0% CaCl$_2$ powder was dispersed in water at 145-150° F. and mixed for 15 minutes. Milk and NFDM were added and the product was then mixed for an additional 20 minutes while still maintaining a temperature between 145-150° F. The product was then cooled to 100-110° F. The orange juice concentrate and citric acid (50/50 blend with DI water) were then added and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.83 and viscosity of 18.6 cP and was stable for 4 weeks with no serum separation and trace to no sediment.

Example 28

Low pH Beverage

Samples were prepared using 0.4% of a 80:20 MCC/HP-1050B 1.1 DS CMC with 5.0% CaCl$_2$ composition and 0.35% of added HP-1050B CMC.

| Formulations @ 3.5 g protein/8 oz serving | % by wt. |
|---|---|
| OJ concentrate | 4.21% |
| Sugar | 8.00% |
| Skim Milk | 20.00% |
| Nonfat Dry Milk | 1.73% |
| Citric Acid | 0.25% |
| MCC/HP-1050B CMC (80:20) and 5.0% CaCl$_2$ | 0.4% |
| HP-1050B CMC | 0.35% |
| Water | to 100% |

The 80:20 MCC/HP-1050B with 5.0% CaCl$_2$ powder was dispersed in water at 145-150° F. and mixed for 15 minutes. Additional HP-1050B CMC was then added and mixed until hydrated, or for approximately 10 minutes. Then milk and NFDM were added and the product was then mixed for an additional 20 minutes while still maintaining a temperature between 145-150° F. The product was then cooled to 100-110° F. The orange juice concentrate and citric acid (50/50 blend) were then added and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds and homogenized in two stages at 2500 psi (2000 psi, 500 psi). Finally, the mixture was cooled to 20° C. and filled. The product had a pH of 4.27 and viscosity of 125 cP and was stable for 6 weeks with no serum separation and no sediment.

Example 29

Low pH Beverage

Samples were prepared using 0.4% of an 80:20 MCC/HP-1050B 1.1 DS CMC and 5.0% CaCl$_2$ composition with 0.35% of added HP-1050B CMC.

| Formulations @ 3.5 g protein/8 oz serving | % by wt. |
|---|---|
| OJ concentrate | 4.21% |
| Sugar | 8.00% |
| Skim Milk | 20.00% |
| Nonfat Dry Milk | 1.73% |
| Citric Acid | 0.25% |
| MCC/HP-1050B CMC (80:20) and 5.0% CaCl$_2$ | 0.4% |
| HP-1050B CMC | 0.35% |
| Water | to 100% |

The 80:20 MCC/HP-1050B with 5.0% CaCl$_2$ powder was dispersed in water at 145-150° F. and mixed for 15 minutes. Additional HP-1050B CMC was then added and mixed until hydrated, or for approximately 10 minutes. Milk and NFDM were added and the product was then mixed for an additional 20 minutes while still maintaining a temperature between 145-150° F. The product was then cooled to 100-110° F. The orange juice concentrate and citric acid (50/50 blend with DI water) were then added and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.25 and viscosity of 87.2 cP and was stable for 2 weeks with no serum separation and no sediment.

Example 30

Low pH Beverage

Samples were prepared using 0.4% of a 80:20 MCC/Akzo 1.1 DS CMC and 5.0% CaCl$_2$ composition with 0.35% of added Akzo 1.1 DS CMC.

| Formulations @ 3.5 g protein/8 oz serving | % by wt. |
|---|---|
| OJ concentrate | 4.21% |
| Sugar | 8.00% |
| Skim Milk | 20.00% |
| Nonfat Dry Milk | 1.73% |
| Citric Acid | 0.25% |
| MCC/Akzo 1.1 DS CMC (80:20) and 5.0% CaCl$_2$ | 0.4% |
| Akzo 1.1 DS CMC | 0.35% |
| Water | to 100% |

The 80:20 MCC/Akzo 1.1 DS CMC with 5.0% CaCl$_2$ powder was dispersed in water at a temperature of 145° F. to 150° F. and mixed for 15 minutes. Additional Akzo 1.1 CMC was then added and mixed until hydrated, or for approximately 10 minutes. Then milk and NFDM were added and the product was then mixed for an additional 20 minutes while still maintaining a temperature of 145° F. to 150° F. The product was then cooled to a temperature of 100° F. to 110° F. The orange juice concentrate and citric acid (50/50 blend) were then added and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds and homogenized in two stages at 2500 psi (2000 psi, 500 psi). Finally, the mixture was cooled to 20° C. and filled. The product had a pH of 4.37 and viscosity of 27 cP and was stable for 3 weeks with no serum separation and no sediment.

Example 31

Low pH Beverage

Samples were prepared using 0.5% of an 80:20 MCC/Akzo 1.1 DS CMC and 5.0% $CaCl_2$ composition with 0.33% of added Akzo 1.1 DS CMC.

| Formulation @ 3.5 g protein/8 oz serving | % by wt. |
|---|---|
| OJ concentrate | 4.21% |
| Sugar | 8.00% |
| Skim Milk | 20.00% |
| Nonfat Dry Milk | 1.73% |
| Citric Acid | 0.25% |
| MCC/Akzo 1.1 DS CMC (80:20) and 5.0% $CaCl_2$ | 0.5% |
| Akzo 1.1 DS CMC | 0.33% |
| Water | to 100% |

The 80:20 MCC/Akzo 1.1 DS CMC with 5% $CaCl_2$ powder was dispersed in water at 145-150° F. and mixed for 15 minutes. Additional Akzo 1.1 CMC was then added and mixed until hydrated, or for approximately 10 minutes. Then milk and NFDM were added and the product was then mixed for an additional 20 minutes while still maintaining a temperature between 145-150° F. The product was then cooled to 100-110° F. The orange juice concentrate and citric acid (50/50 blend) were then added and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds and homogenized in two stages at 2500 psi (2000 psi, 500 psi). Finally, the mixture was cooled to 20° C. and filled. The product had a pH of 4.32 and viscosity of 35.5 cP and was stable for 3 weeks with no serum separation and no sediment.

Example 32

Low pH Beverage

Samples were prepared using 0.6% of an 80:20 MCC/Akzo 1.1 DS CMC and 5.0% CaCl2 composition with 0.31% of added Akzo 1.1 DS CMC.

| Formulations @ 3.5 g protein/8 oz serving | % by wt. |
|---|---|
| OJ concentrate | 4.21% |
| Sugar | 8.00% |
| Skim Milk | 20.00% |
| Nonfat Dry Milk | 1.73% |
| Citric Acid | 0.25% |
| MCC/Akzo 1.1 DS CMC (80:20) and 5% $CaCl_2$ | 0.6% |
| Akzo 1.1 DS CMC | 0.31% |
| Water | to 100% |

The 80:20 MCC/Akzo 1.1 DS with 5.0% $CaCl_2$ powder was dispersed in water at 145-150° F. and mixed for 15 minutes. Additional Akzo 1.1 was then added and mixed until hydrated, or for approximately 10 minutes. Then milk and NFDM were added and the product was then mixed for an additional 20 minutes while still maintaining a temperature between 145-150° F. The product was then cooled to 100-110° F. The orange juice concentrate and citric acid (50/50 blend) were then added and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds and homogenized in two stages at 2500 psi (2000 psi, 500 psi). Finally, the mixture was cooled to 20° C. and filled. The product had a pH of 4.27 and viscosity of 53.5 cP and was stable for 3 weeks with no serum separation and no sediment.

Example 33

Calcium Fortified Milk

Samples were prepared using 0.143% of an 80:20 MCC/12M8P CMC and 5.0% $CaCl_2$ composition with 0.117% of food grade calcium carbonate powder.

| Calcium fortified formulation | % by wt. |
|---|---|
| MCC/12M8P CMC (80:20) and 5.0% $CaCl_2$ | 0.143% |
| FG6 Calcium Carbonate | 0.117% |
| Skim Milk | to 100% |

The 80:20 MCC/12M8P CMC with 5.0% $CaCl_2$ powder was dry blended with the FG6 Calcium Carbonate. The mixture was then dispersed in skim milk with high shear. The shear was reduced to minimize excessive air in the product. Using a Microthermics UHT/HTST with in-line Niro-Soavi homogenizer, the product was then pasteurized at 280-285° F. for 6-8 seconds and homogenized in two stages at 3000 psi (2500 psi, 500 psi). Finally, the mixture was cooled to 40° F. and filled. The product had a pH of 6.74 and viscosity of 7.8 cP and was stable for 4 weeks with trace to no sediment.

Example 34

Chocolate Milk

Samples were prepared using 0.2% of an 80:20 MCC/12M8P CMC and 5.0% $CaCl_2$ composition.

| Chocolate milk formulation | % by wt. |
|---|---|
| MCC/12M8P CMC and 5.0% $CaCl_2$ | 0.20% |
| Sugar | 7.50% |
| Cocoa Powder | 1.75% |
| Skim Milk | to 100% |

The 80:20 MCC/12M8P CMC with 5.0% $CaCl_2$ powder was dry blended with the sugar and cocoa powder. The mixture was then dispersed in skim milk at medium shear with a propeller mixer. The shear was reduced to minimize excessive air in the product. Using a Microthermics UHT/HTST with in-line Niro-Soavi homogenizer, the product was then pasteurized at 284° F. for 6 seconds and homogenized in two stages at 2500 psi (2000 psi, 500 psi). Finally, the mixture was cooled to 40° F. and filled. The product had a pH of 6.72 and viscosity of 14.2 cP and was stable for 4 weeks with trace to no sediment and no phase separation or gelation.

Example 35

Low pH Salad Dressings 16.5 grams of the 80:20 MCC/Aqualon 12M8P with 5.0% $CaCl_2$ powder was dispersed in water at ambient temperature (70° F.) and mixed for 5 minutes. 2 grams of xanthan gum was then added and mixed until hydrated, or for approximately 3 minutes. Corn syrup was then added to the dispersion, followed by a dry blend of sugar, buttermilk powder, maltodextrin, powdered egg yolk, MSG, garlic powder, onion powder, potassium sorbate and mustard powder. Liquid soybean oil was added, followed by the incorporation of the salt and vinegar. The mixture was milled and deaerated.

The resulting composition was as follows:

| Formulation | % by wt. |
| --- | --- |
| Corn syrup, 42 DE | 12.00 |
| Soybean oil | 5.00 |
| Vinegar, 120 grain | 5.00 |
| Sugar | 4.00 |
| Cultured buttermilk powder | 4.00 |
| Salt | 2.00 |
| MCC/12M8P CMC (80:20) and 5.0% $CaCl_2$ | 1.65 |
| Maltodextrin M-100 | 1.50 |
| Powdered egg yolk | 0.50 |
| MSG | 0.30 |
| Xanthan gum | 0.20 |
| Garlic powder | 0.18 |
| Onion powder | 0.18 |
| Potassium sorbate | 0.10 |
| Mustard powder | 0.05 |
| Water | to 100% |

The samples were stored in 8 ounce jars and evaluated at 24 hr, 1, 2, and 4-week intervals for viscosity and stability. Viscosity was measured using a Brookfield RVT viscometer with the #3 spindle at 10 rpm. Viscosity results were as follows:

Viscosity Profiles for MCC/Aqualon® 12M8P CMC (80:20) with 5.0% CaCl2 at 1.65% in Conjunction with 0.20% Xanthan Gum

| 24 hour | 1 Week | 2 Weeks | 3 Weeks | 4 Weeks |
| --- | --- | --- | --- | --- |
| 7,150 cps | 7,150 cps | 7,100 cps | 6,900 cps | 6,380 cps |

The results indicate that the MCC/1.2 DS 12M8P CMC (80:20) with 5.0% $CaCl_2$ product provides the necessary stability in a low pH salad dressings application.

Example 36

Low pH Salad Dressings 16.5 grams of the 80:20 MCC/Cellogen® HP1050B CMC with 5.0% $CaCl_2$ powder was dispersed in water at ambient temperature (70° F.) and mixed for 5 minutes. 2 grams of xanthan gum was then added and mixed until hydrated, or for approximately 3 minutes. Corn syrup was then added to the dispersion, followed by a dry blend of sugar, buttermilk powder, maltodextrin, powdered egg yolk, MSG, garlic powder, onion powder, potassium sorbate and mustard powder. Liquid soybean oil was added, followed by the incorporation of the salt and vinegar. The mixture was milled and deaerated.

The resulting composition was as follows:

| Formulation | % by wt. |
| --- | --- |
| Corn syrup, 42 DE | 12.00 |
| Soybean oil | 5.00 |
| Vinegar, 120 grain | 5.00 |
| Sugar | 4.00 |
| Cultured buttermilk powder | 4.00 |
| Salt | 2.00 |
| MCC/HP1050B CMC (80:20) and 5.0% $CaCl_2$ | 1.65 |
| Maltodextrin M-100 | 1.50 |
| Powdered egg yolk | 0.50 |
| MSG | 0.30 |
| Xanthan gum | 0.20 |
| Garlic powder | 0.18 |
| Onion powder | 0.18 |
| Potassium sorbate | 0.10 |
| Mustard powder | 0.05 |
| Water | to 100% |

The samples were stored in 8 ounce jars and evaluated at 24 hr, 1, 2, and 4-week intervals for viscosity and stability. Viscosity was measured using a Brookfield RVT viscometer with the #3 spindle at 10 rpm. Viscosity results were as follows:

Viscosity Profiles for MCC/Cellogen HP-1050B CMC (80:20) with 5.0% CaCl2 at 1.65% in Conjunction with 0.20% Xanthan Gum

| 24 hour | 1 Week | 2 Weeks | 3 Weeks | 4 Weeks |
| --- | --- | --- | --- | --- |
| 7,500 cps | 8,250 cps | 8,250 cps | 8,050 cps | 7,630 cps |

The results indicate that the MCC/1.2 DS HP-1050B CMC (80:20) with 5.0% $CaCl_2$ product provides the necessary stability in a low pH salad dressings application.

Example 37

Low pH salad dressings 16.5 grams of the 80:20 MCC/Akzo 1.1 DS CMC with 5.0% $CaCl_2$ powder was dispersed in water at ambient temperature (70° F.) and mixed for 5 minutes. 2 grams of xanthan gum was then added and mixed until hydrated, or for approximately 3 minutes. Corn syrup was then added to the dispersion, followed by a dry blend of sugar, buttermilk powder, maltodextrin, powdered egg yolk, MSG, garlic powder, onion powder, potassium sorbate and mustard powder. Liquid soybean oil was added, followed by the incorporation of the salt and vinegar. The mixture was milled and deaerated.

The resulting composition was as follows:

| Formulation | % by wt. |
| --- | --- |
| Corn syrup, 42 DE | 12.00 |
| Soybean oil | 5.00 |
| Vinegar, 120 grain | 5.00 |
| Sugar | 4.00 |
| Cultured buttermilk powder | 4.00 |

-continued

| Formulation | % by wt. |
|---|---|
| Salt | 2.00 |
| MCC/Akzo 1.1 CMC (80:20) and 5.0% CaCl$_2$ | 1.65 |
| Maltodextrin M-100 | 1.50 |
| Powdered egg yolk | 0.50 |
| MSG | 0.30 |
| Xanthan gum | 0.20 |
| Garlic powder | 0.18 |
| Onion powder | 0.18 |
| Potassium sorbate | 0.10 |
| Mustard powder | 0.05 |
| Water | to 100% |

The samples were stored in 8 ounce jars and evaluated at 24 hr, 1, 2, and 4-week intervals for viscosity and stability. Viscosity was measured using a Brookfield RVT viscometer with the #3 spindle at 10 rpm. Viscosity results were as follows:

Viscosity Profiles for MCC/Akzo 1.1 DS CMC (80:20) with 5.0% CaCl$_2$ at 1.65% in Conjunction with 0.20% Xanthan Gum

| 24 hour | 1 Week | 2 Weeks | 3 Weeks | 4 Weeks |
|---|---|---|---|---|
| 6,350 cps | 6,300 cps | 6,275 cps | 6,250 cps | 5,775 cps |

The results indicate that the MCC/Akzo 1.1 DS CMC (80:20) with 5.0% CaCl$_2$ product provides the necessary stability in a low pH salad dressings application.

Example 38

Low pH Salad Dressings 16.5 grams of the 80:20 MCC/Akzo 1.2 DS CMC with 5.0% CaCl$_2$ powder was dispersed in water at ambient temperature (70° F.) and mixed for 5 minutes. 2 grams of xanthan gum was then added and mixed until hydrated, or for approximately 3 minutes. Corn syrup was then added to the dispersion, followed by a dry blend of sugar, buttermilk powder, maltodextrin, powdered egg yolk, MSG, garlic powder, onion powder, potassium sorbate and mustard powder. Liquid soybean oil was added, followed by the incorporation of the salt and vinegar. The mixture was milled and deaerated.

The resulting composition is as follows:

| Formulation | % by wt. |
|---|---|
| Corn syrup, 42 DE | 12.00 |
| Soybean oil | 5.00 |
| Vinegar, 120 grain | 5.00 |
| Sugar | 4.00 |
| Cultured buttermilk powder | 4.00 |
| Salt | 2.00 |
| MCC/Akzo 1.1 DS CMC (80:20) and 5.0% CaCl$_2$ | 1.65 |
| Maltodextrin M-100 | 1.50 |
| Powdered egg yolk | 0.50 |
| MSG | 0.30 |
| Xanthan gum | 0.20 |
| Garlic powder | 0.18 |
| Onion powder | 0.18 |
| Potassium sorbate | 0.10 |
| Mustard powder | 0.05 |
| Water | to 100% |

The samples were stored in 8 ounce jars and evaluated at 24 hr, 1, 2, and 4-week intervals for viscosity and stability. Viscosity was measured using a Brookfield RVT viscometer with the #3 spindle at 10 rpm. Viscosity results were as follows:

Viscosity Profiles for MCC/Akzo 1.2 DS CMC(80:20) with 5.0% CaCl$_2$ at 1.65% in Conjunction with 0.20% Xanthan Gum

| 24 hour | 1 Week | 2 Weeks | 3 Weeks | 4 Weeks |
|---|---|---|---|---|
| 5,680 cps | 6,025 cps | 6,025 cps | 5,900 cps | 5,350 cps |

The results indicate that the MCC/Akzo 1.2 DS CMC (80:20) with 5.0% CaCl$_2$ product provides the necessary stability in a low pH salad dressings application.

Example 39

Low pH Salad Dressing 16.5 grams of the 80:20 MCC/Aqualon® 9M65XF CMC with 5.0% CaCl$_2$ powder was dispersed in water at ambient temperature (70° F.) and mixed for 5 minutes. 2 grams of xanthan gum was then added and mixed until hydrated, or for approximately 3 minutes. Corn syrup was then added to the dispersion, followed by a dry blend of sugar, buttermilk powder, maltodextrin, powdered egg yolk, MSG, garlic powder, onion powder, potassium sorbate and mustard powder. Liquid soybean oil was added, followed by the incorporation of the salt and vinegar. The mixture was milled and deaerated. The resulting composition was as follows:

| Formulation | % by wt. |
|---|---|
| Corn syrup, 42 DE | 12.00 |
| Soybean oil | 5.00 |
| Vinegar, 120 grain | 5.00 |
| Sugar | 4.00 |
| Cultured buttermilk powder | 4.00 |
| Salt | 2.00 |
| MCC/Aqualon ® 9M65XF CMC (80:20) with 5.0% CaCl$_2$ | 1.65 |
| Maltodextrin M-100 | 1.50 |
| Powdered egg yolk | 0.50 |
| MSG | 0.30 |
| Xanthan gum | 0.20 |
| Garlic powder | 0.18 |
| Onion powder | 0.18 |
| Potassium sorbate | 0.10 |
| Mustard powder | 0.05 |
| Water | to 100% |

The samples were stored in 8 ounce jars and evaluated at 24 hr, 1, 2, and 4-week intervals for viscosity and stability. Viscosity was measured using a Brookfield RVT viscometer with the #3 spindle at 10 rpm. Viscosity results were as follows:

Viscosity Profiles for MCC/9M65XF CMC (80:20) with 5.0% CaCl$_2$ at 1.65% in Conjunction with 0.20% Xanthan Gum

| 24 hour | 1 Week | 2 Weeks | 3 Weeks | 4 Weeks |
|---|---|---|---|---|
| 7,500 cps | 6,700 cps | 5,950 cps | 5,200 cps | 4,900 cps |

The results indicate that the MCC/9M65XF 0.9 DS CMC used is not as effective in maintaining viscosity as compared with the 1.2 DS CMC samples.

Example 40

Low pH Salad Dressing 16.5 grams of the 80:20 MCC/Aqualon® 9H4F CMC with 5.0% CaCl$_2$ powder was dispersed in water at ambient temperature (70° F.) and mixed for 5 minutes. 2 grams of xanthan gum was then added and mixed until hydrated, or for approximately 3 minutes. Corn syrup was then added to the dispersion, followed by a dry blend of sugar, buttermilk powder, maltodextrin, powdered egg yolk, MSG, garlic powder, onion powder, potassium sorbate and mustard powder. Liquid soybean oil was added, followed by the incorporation of the salt and vinegar. The mixture was milled and deaerated. The resulting composition was as follows:

| Formulation | % by wt. |
|---|---|
| Corn syrup, 42 DE | 12.00 |
| Soybean oil | 5.00 |
| Vinegar, 120 grain | 5.00 |
| Sugar | 4.00 |
| Cultured buttermilk powder | 4.00 |
| Salt | 2.00 |
| MCC/Aqualon ® 9H4F CMC (80:20) with 5.0% CaCl$_2$ | 1.65 |
| Maltodextrin M-100 | 1.50 |
| Powdered egg yolk | 0.50 |
| MSG | 0.30 |
| Xanthan gum | 0.20 |
| Garlic powder | 0.18 |
| Onion powder | 0.18 |
| Potassium sorbate | 0.10 |
| Mustard powder | 0.05 |
| Water | to 100% |

The samples were stored in 8 ounce jars and evaluated at 24 hr, 1, 2, and 4-week intervals for viscosity and stability. Viscosity was measured using a Brookfield RVT viscometer with the #3 spindle at 10 rpm. Viscosity results were as follows:

Viscosity Profiles for MCC/9H4F CMC (80:20) with 5.0% CaCl$_2$ at 1.65% in Conjunction with 0.20% Xanthan Gum

| 24 hour | 1 Week | 2 Weeks | 3 Weeks | 4 Weeks |
|---|---|---|---|---|
| 4,475 cps | 3,850 cps | 3,150 cps | 2,750 cps | 2,500 cps |

The results indicate that the MCC/Aqualon 9H4F 0.9 DS CMC (80:20) with 5.0% CaCl$_2$ product is not as effective in maintaining viscosity as compared with the tested 80:20 MCC/CMC with 5.0% CaCl$_2$ using the 1.2 DS CMC samples.

Example 41

Spoonable Salad Dressings 5.25 grams of the 80/20 MCC/9H4F CMC with 4% CaCl$_2$ powder was dispersed in 60% of the available water at ambient temperature (70° F.) and mixed for 5 minutes. The xanthan gum was then dry blended with the sugar and mixed until hydrated, or for approximately 5 minutes. Next, a dry blend of powdered egg yolk, EDTA, garlic powder, onion powder, potassium sorbate and mustard powder was added and mixed for 3 minutes or until fully incorporated. Liquid soybean oil was then added. Separately, the starch, vinegar, and salt were added to the other 40% of the available water. This mixture was heated to 185° F.-190° F. and held for 10 minutes, then cooled to 100° F. Both mixtures were added to a Hobart mixing bowl and mixed together until uniform. The resulting mixture was then milled and deaerated before filling. The resulting composition is as follows:

| Formulation | % by wt. |
|---|---|
| Soybean oil | 30.00 |
| Vinegar, 120 grain | 5.50 |
| Sugar | 4.00 |
| Salt | 2.50 |
| 80/20 MCC/9H4F with 4% CaCl$_2$ | 0.525 |
| THERMFLO Food Starch- Modified | 3.50 |
| Powdered egg yolk | 1.50 |
| Calcium Imodium EDTA | 0.01 |
| Xanthan gum | 0.40 |
| Garlic powder | 0.01 |
| Onion powder | 0.01 |
| Potassium sorbate | 0.10 |
| Mustard powder | 0.25 |
| Water | to 100% |

The samples were stored in 8 ounce jars and evaluated at 24 hr, 1, 2, 3, and 4-week intervals for viscosity. Viscosity was measured using a Brookfield RVT viscometer with the #4 T-bar spindle at 10 rpm. Viscosity results were as follows:

Viscosity Profiles for 80/20 MCC/9H4F with 4% CaCl$_2$ at .525% in Conjunction with 0.40% Xanthan Gum

| 24 hour | 1 Week | 2 Weeks | 3 Weeks | 4 Weeks |
|---|---|---|---|---|
| 47500 | 55500 | 54000 | 51500 | 51500 |

The preliminary results suggest that there is potential to offer equivalent viscosity/rheological properties with greater than 30% reduction in the MCC-based stabilizer component.

Example 42

Spoonable Salad Dressings 5.25 grams of the 80/20 MCC/HP1215C CMC with 4% CaCl$_2$ powder was dispersed in 60% of the available water at ambient temperature (70° F.) and mixed for 5 minutes. The xanthan gum was then dry blended with the sugar and mixed until hydrated, or for approximately 5 minutes. Next, a dry blend of powdered egg yolk, EDTA, garlic powder, onion powder, potassium sorbate and mustard powder was added and mixed for 3 minutes or until fully incorporated. Liquid soybean oil was then added. Separately, the starch, vinegar, and salt were added to the other 40% of the available water. This mixture was heated to 185° F.-190° F. and held for 10 minutes, then cooled to 100° F. Both mixtures were added to a Hobart mixing bowl and mixed together until uniform. The resulting mixture was then milled and deaerated before filling. The resulting composition was as follows:

| Formulation | % by wt. |
|---|---|
| Soybean oil | 30.00 |
| Vinegar, 120 grain | 5.50 |
| Sugar | 4.00 |
| Salt | 2.50 |
| 80/20 MCC/HP1215C with 4% CaCl$_2$ | 0.525 |
| THERMFLO Food Starch- Modified | 3.50 |
| Powdered egg yolk | 1.50 |
| Calcium Imodium EDTA | 0.01 |
| Xanthan gum | 0.40 |
| Garlic powder | 0.01 |
| Onion powder | 0.01 |
| Potassium sorbate | 0.10 |
| Mustard powder | 0.25 |
| Water | to 100% |

The samples were stored in 8 ounce jars and evaluated at 24 hr, 1, 2, 3, and 4-week intervals for viscosity. Viscosity was measured using a Brookfield RVT viscometer with the #4 T-bar spindle at 10 rpm. Viscosity results were as follows:

Viscosity Profiles for 80/20 MCC/HP1215C with 4% CaCl2 at 0.525% in Conjunction with 0.40% Xanthan Gum

| 24 hour | 1 Week | 2 Weeks | 3 Weeks | 4 Weeks |
|---|---|---|---|---|
| 91000 | 98000 | 101000 | 99000 | 96000 |

The preliminary results suggest that there is potential to offer equivalent rheological properties with greater than 30% reduction in the MCC based stabilizer component, and the usage level reduction can be even greater to offer equivalent viscosity.

Example 43

Spoonable Salad Dressings 5.25 grams of the 80/20 MCC/12M31P CMC with 3% CaCl$_2$ powder was dispersed in 60% of the available water at ambient temperature (70° F.) and mixed for 5 minutes. The xanthan gum was then dry blended with the sugar and mixed until hydrated, or for approximately 5 minutes. Next, a dry blend of powdered egg yolk, EDTA, garlic powder, onion powder, potassium sorbate and mustard powder was added and mixed for 3 minutes or until fully incorporated. Liquid soybean oil was then added. Separately, the starch, vinegar, and salt were added to the other 40% of the available water. This mixture was heated to 185° F.-190° F. and held for 10 minutes, then cooled to 100° F. Both mixtures were added to a Hobart mixing bowl and mixed together until uniform. Then the resulting mixture was milled and deaerated before filling. The resulting composition is as follows:

| Formulation | % by wt. |
|---|---|
| Soybean oil | 30.00 |
| Vinegar, 120 grain | 5.50 |
| Sugar | 4.00 |
| Salt | 2.50 |
| 80/20 MCC/12M31P with 3% CaCl$_2$ | 0.525 |
| THERMFLO Food Starch- Modified | 3.50 |
| Powdered egg yolk | 1.50 |
| Calcium Imodium EDTA | 0.01 |
| Xanthan gum | 0.40 |
| Garlic powder | 0.01 |
| Onion powder | 0.01 |
| Potassium sorbate | 0.10 |
| Mustard powder | 0.25 |
| Water | to 100% |

The samples were stored in 8 ounce jars and evaluated at 24 hr, 1, and 2-week intervals for viscosity. Viscosity was measured using a Brookfield RVT viscometer with the #4 T-bar spindle at 10 rpm. Viscosity results were as follows:

Viscosity Profiles for 80/20 MCC/12M31P with 3% CaCl2 at 0.525% in Conjunction with 0.40% Xanthan Gum

| 24 hour | 1 Week | 2 Weeks |
|---|---|---|
| 56500 | 70500 | 68000 |

The preliminary results suggest that there is potential to offer equivalent viscosity/rheological properties with greater than 30% reduction in the MCC-based stabilizer component.

Example 44

Spoonable Salad Dressings 5.25 grams of the 80/20 MCC/Akzo 1.3DS CMC with 4% CaCl$_2$ powder was dispersed in 60% of the available water at ambient temperature (70° F.) and mixed for 5 minutes. The xanthan gum was then dry blended with the sugar and mixed until hydrated, or for approximately 5 minutes. Next, a dry blend of powdered egg yolk, EDTA, garlic powder, onion powder, potassium sorbate and mustard powder was added and mixed for 3 minutes or until fully incorporated. Liquid soybean oil was then added. Separately, the starch, vinegar, and salt were added to the other 40% of the available water. This mixture was heated to 185° F.-190° F. and held for 10 minutes, then cooled to 100° F. Both mixtures were added to a Hobart mixing bowl and mixed together until uniform. The resulting mixture was then milled and deaerated before filling. The resulting composition is as follows:

| Formulation | % by wt. |
|---|---|
| Soybean oil | 30.00 |
| Vinegar, 120 grain | 5.50 |

-continued

| Formulation | % by wt. |
|---|---|
| Sugar | 4.00 |
| Salt | 2.50 |
| 80/20 MCC/Akzo 1.3DS with 4% $CaCl_2$ | 0.525 |
| THERMFLO Food Starch- Modified | 3.50 |
| Powdered egg yolk | 1.50 |
| Calcium Imodium EDTA | 0.01 |
| Xanthan gum | 0.40 |
| Garlic powder | 0.01 |
| Onion powder | 0.01 |
| Potassium sorbate | 0.10 |
| Mustard powder | 0.25 |
| Water | to 100% |

The samples were stored in 8 ounce jars and evaluated at 24 hr, 1, and 2-week intervals for viscosity. Viscosity was measured using a Brookfield RVT viscometer with the #4 T-bar spindle at 10 rpm. Viscosity results were as follows:

Viscosity Profiles for 80/20 MCC/Akzo 1.3DS with 4% CaCl2 at 0.525% in Conjunction with 0.40% Xanthan Gum

| 24 hour | 1 Week | 2 Weeks |
|---|---|---|
| 58000 | 71000 | 71000 |

The preliminary results suggest that there is potential to offer equivalent viscosity/rheological properties with greater than 30% reduction in the MCC-based stabilizer component.

Example 45

Akucell AF2895—Sauce

Sauces were made using 80/20 MCC/Akzo Akucell AF2895 CMC with 4% $CaCl_2$ in addition to other edible ingredients, as shown in the table below.

| Ingredients | Control % by weight | Sample A % by weight | Sample B % by weight |
|---|---|---|---|
| Water | 30.70 | 29.70 | 30.20 |
| Pureed Red Roasted Peppers | 30.00 | 30.00 | 30.00 |
| Sugar | 22.00 | 22.00 | 22.00 |
| Rice vinegar | 9.00 | 9.00 | 9.00 |
| Salt | 4.00 | 4.00 | 4.00 |
| MCC/High DS CMC* | 0.00 | 2.50 | 1.00 |
| Starch** | 1.50 | 0.00 | 1.00 |
| Chili powder | 1.50 | 1.50 | 1.50 |
| Minced garlic | 1.00 | 1.00 | 1.00 |
| Ground ginger | 0.20 | 0.20 | 0.20 |
| Potassium sorbate | 0.10 | 0.10 | 0.10 |
| | 100.00 | 100.00 | 100.00 |

*MCC/Akzo AkucellAF2895 CMC (80:20) with 4% $CaCl_2$
**National Starch Food Innovation - Colflo 67
pH of sauce - 3.5

For Samples A and B, the MCC/Akzo Akucell AF2895 compositions were dispersed in water. For Sample B, the MCC/AkucellAF2895 composition was dispersed in the total volume of water; whereas, for Sample A, the MCC/Akzo AkucellAF2895 composition was dispersed within 50% of the total available water. The mixing was performed over about 5 minutes using a Lighting mixer. The dispersion was transferred to a Silverson Mixer. Separately, the pureed peppers, sugar, salt, chili powder, minced garlic, ground ginger, and potassium sorbate was blended. The dispersion containing the MCC/Akucell AF2895 composition was added to a Thermomixer and the pureed pepper mixture was slowly added to the dispersion. In the case of control and Sample A, starch was mixed into the remaining water, forming a slurry, and was added to this mixture. The starch was mixed at 185° F. for about 5 minutes. Rice vinegar was added and mixing was continued for 5 minutes without heat. The resulting mixture was transferred to jars and stored at room temperature.

Viscosity of the three sauces, control, Sample A, and Sample B, was measured using a Brookfield RVt Viscometer with a Spindle #3 at 10 rpm for 30 seconds. Measurements were taken at the initial point (time where the sauces were stored in their respective jars), 1 week after initial, and 8 weeks after initial, which are shown in the following table.

Viscosity Profiles

| | Control cps | Sample A cps | Sample B cps |
|---|---|---|---|
| Set-up viscosity | 4,050 | 3,850 | 3,550 |
| 1-week | 4,350 | 3,800 | 4,000 |
| 8-weeks | 4,800 | 4,050 | 3,800 |

Brookfield RVt Viscometer - Spindle #3 at 10 rpm for 30 seconds.

The control consistently increased in viscosity over time, with a final increase of 750 cps over 8 weeks, while both Sample A and Sample B maintain nearly the same level of viscosity over the same period, Sample A increasing only 200 cps and Sample B increasing only 250 cps. The results show that the MCC/Akzo AkucellAF2895 (80:20) with 4.0% $CaCl_2$ composition, which includes a CMC having a high degree of substitution, adds to the stability of the respective sauces.

Example 46

Fruit Filling

Samples were prepared using 0.35% of 80:20 MCC/12M31P CMC with 3% $CaCl_2$.

| Formulation | |
|---|---|
| Frozen Raspberries | 20.00% |
| Sugar | 33.70% |
| Modified Starch (colfo 67) | 2.00% |
| K-Sorbate | 0.10% |
| LM Amidated Pectin Grinsted LA 410 | 0.50% |
| 3% Ca-Lactate Solution | 0.50% |
| 50% Citric Acid Solution | 0.70% |
| MCC/12M31P 80/20 with 3% $CaCl_2$ | 0.35% |
| Water | to 100% |

A 80:20 composition of MCC/12M31P CMC was dry blended with the LM Amidated Pectin Grinsted LA 410 before being added to the available water using high shear mixing in a Thermomixer. This was mixed for 7 minutes. While continuing to mix, a dry blend of the starch, sugar and K-sorbate was added to the mixture. While this was being added, the mixture was heated to 90° C., once at 90° C. the temperature was maintained and was allowed to mix for 10 minutes. Next, the fruit was added and mixed for another 10 minutes. Then the Ca-Lactate solution was added followed by the citric acid solution. The filling was immediately poured into jars. The initial viscosity of this sample was 3,925 cps and the sample was 37° Brix. When baked for 10 minutes at 400° F. the sample spread 40.15% on a flat cookie sheet. The amount of force needed to break this filling after 24 hour setup was 35.375 grams. This represents the hardness of the sample and is representative of gel strength.

Example 47

Fruit Filling

Samples were prepared using 0.40% of 80:20 MCC/12M31P CMC with 3% $CaCl_2$.

| Formulation | |
|---|---|
| Frozen Raspberries | 20.00% |
| Sugar | 33.70% |
| Modified Starch (colfo 67) | 2.00% |
| K-Sorbate | 0.10% |
| LM Amidated Pectin Grinsted LA 410 | 0.50% |
| 3% Ca-Lactate Solution | 0.50% |
| 50% Citric Acid Solution | 0.70% |
| MCC/12M31P 80/20 with 3% $CaCl_2$ | 0.40% |
| Water | to 100% |

A 80:20 composition of MCC/12M31P CMC was dry blended with the LM Amidated Pectin Grinsted LA 410 before being added to the available water using high shear mixing in a Thermomixer. This was mixed for 7 minutes. While continuing to mix, a dry blend of the starch, sugar and K-sorbate was added to the mixture. While this was being added, the mixture was heated to 90° C., once at 90° C. the temperature was maintained and was allowed to mix for 10 minutes. Next, the fruit was added and mixed for another 10 minutes. Then the Ca-Lactate solution was added followed by the citric acid solution. The filling was immediately poured into jars. The initial viscosity of this sample was 4,200 cps and the samples were 36.5° Brix. When baked for 10 minutes at 400° F. the sample spread 38.43% on a flat cookie sheet. The amount of force needed to break this filling after 24 hour setup was 39.405 grams. This represents the hardness of the sample and is representative of gel strength.

Example 48

Fruit Filling

Samples were prepared using 0.35% of 80:20 MCC/Akzo 1.3DS High Viscosity CMC with 4% $CaCl_2$.

| Formulation | |
|---|---|
| Frozen Raspberries | 20.00% |
| Sugar | 33.70% |
| Modified Starch (colfo 67) | 2.00% |
| K-Sorbate | 0.10% |
| LM Amidated Pectin Grinsted LA 410 | 0.50% |
| 3% Ca-Lactate Solution | 0.50% |
| 50% Citric Acid Solution | 0.70% |
| MCC/Akzo 1.3DS High Viscosity 80/20 with 4% $CaCl_2$ | 0.35% |
| Water | to 100% |

A 80:20 composition of MCC/Akzo 1.3DS High Viscosity CMC with 4% CaCl2 was dry blended with the LM Amidated Pectin Grinsted LA 410 before being added to the available water using high shear mixing in a Thermomixer. This was mixed for 7 minutes. While continuing to mix, a dry blend of the starch, sugar and K-sorbate was added to the mixture. While this was being added, the mixture was heated to 90° C., once at 90° C. the temperature was maintained and was allowed to mix for 10 minutes. Next, the fruit was added and mixed for another 10 minutes. Then the Ca-Lactate solution was added followed by the citric acid solution. The filling was immediately poured into jars. The initial viscosity of this sample was 5,050 cps and the samples were 36.5° Brix. When baked for 10 minutes at 400° F. the sample spread 34.86% on a flat cookie sheet. The amount of force needed to break this filling after 24 hour setup was 37.875 grams. This represents the hardness of the sample and is representative of gel strength.

Example 49

Fruit Filling

Samples were prepared using 0.40% of 80:20 MCC/Akzo 1.3DS High Viscosity CMC with 4% $CaCl_2$.

| Formulation | |
|---|---|
| Frozen Raspberries | 20.00% |
| Sugar | 33.70% |
| Modified Starch (colfo 67) | 2.00% |
| K-Sorbate | 0.10% |
| LM Amidated Pectin Grinsted LA 410 | 0.50% |
| 3% Ca-Lactate Solution | 0.50% |
| 50% Citric Acid Solution | 0.70% |
| MCC/Akzo 1.3DS High Viscosity 80/20 with 4% $CaCl_2$ | 0.40% |
| Water | to 100% |

A 80:20 composition of MCC/Akzo 1.3DS High Viscosity CMC with 4% $CaCl_2$ was dry blended with the LM Amidated Pectin Grinsted LA 410 before being added to the available water using high shear mixing in a Thermomixer. This was mixed for 7 minutes. While continuing to mix, a dry blend of the starch, sugar and K-sorbate was added to the mixture. While this was being added, the mixture was heated to 90° C., once at 90° C. the temperature was maintained and was allowed to mix for 10 minutes. Next, the fruit was added and mixed for another 10 minutes. Then the Ca-Lactate solution was added followed by the citric acid solution. The filling was immediately poured into jars. The initial viscosity of this sample was 5,150 cps and the samples were 36° Brix. When baked for 10 minutes at 400° F. the sample spread 27.72% on a flat cookie sheet. The amount of force needed to break this filling after 24 hour setup was 38.568 grams. This represents the hardness of the sample and is representative of gel strength.

Example 50

Fruit Filling

Samples were prepared using 0.35% of 80:20 MCC/HP1215C CMC with 4% $CaCl_2$.

| Formulation | |
|---|---|
| Frozen Raspberries | 20.00% |
| Sugar | 33.70% |
| Modified Starch (colfo 67) | 2.00% |
| K-Sorbate | 0.10% |
| LM Amidated Pectin Grinsted LA 410 | 0.50% |
| 3% Ca-Lactate Solution | 0.50% |
| 50% Citric Acid Solution | 0.70% |
| MCC/HP1215C 80/20 with 4% $CaCl_2$ | 0.35% |
| Water | to 100% |

A 80:20 composition of MCC/HP1215C CMC with 4% $CaCl_2$ was dry blended with the LM Amidated Pectin Grinsted LA 410 before being added to the available water using high shear mixing in a Thermomixer. This was mixed for 7 minutes. While continuing to mix, a dry blend of the starch, sugar and K-sorbate was added to the mixture. While this was being added, the mixture was heated to 90° C., once at 90° C. the temperature was maintained and was allowed to mix for 10 minutes. Next, the fruit was added and mixed for another 10 minutes. Then the Ca-Lactate solution was added followed by the citric acid solution. The filling was immediately poured into jars. The initial viscosity of this sample was 3,650 cps and the samples were 36° Brix. When baked for 10 minutes at 400° F. the sample spread 40.15% on a flat cookie sheet. The amount of force needed to break this filling after 24 hour setup was 33.973 grams. This represents the hardness of the sample and is representative of gel strength.

Example 51

Fruit Filling

Samples were prepared using 0.40% of 80:20 MCC/HP1215C CMC with 4% $CaCl_2$.

| Formulation | |
|---|---|
| Frozen Raspberries | 20.00% |
| Sugar | 33.70% |
| Modified Starch (colfo 67) | 2.00% |
| K-Sorbate | 0.10% |
| LM Amidated Pectin Grinsted LA 410 | 0.50% |
| 3% Ca-Lactate Solution | 0.50% |
| 50% Citric Acid Solution | 0.70% |
| MCC/HP1215C 80/20 with 4% $CaCl_2$ | 0.40% |
| Water | to 100% |

A 80:20 composition of MCC/HP1215C CMC with 4% $CaCl_2$ was dry blended with the LM Amidated Pectin Grinsted LA 410 before being added to the available water using high shear mixing in a Thermomixer. This was mixed for 7 minutes. While continuing to mix, a dry blend of the starch, sugar and K-sorbate was added to the mixture. While this was being added, the mixture was heated to 90° C., once at 90° C. the temperature was maintained and was allowed to mix for 10 minutes. Next, the fruit was added and mixed for another 10 minutes. Then the Ca-Lactate solution was added followed by the citric acid solution. The filling was immediately poured into jars. The initial viscosity of this sample was 3,950 cps and the samples were 36° Brix. When baked for 10 minutes at 400° F. the sample spread 37.57% on a flat cookie sheet. The amount of force needed to break this filling after 24 hour setup was 30.164 grams. This represents the hardness of the sample and is representative of gel strength.

Example 52

Fruit Filling

Samples were prepared using 0.35% of 80:20 MCC/9H4F CMC with 4% $CaCl_2$.

| Formulation | |
|---|---|
| Frozen Raspberries | 20.00% |
| Sugar | 33.70% |
| Modified Starch (colfo 67) | 2.00% |
| K-Sorbate | 0.10% |
| LM Amidated Pectin Grinsted LA 410 | 0.50% |
| 3% Ca-Lactate Solution | 0.50% |
| 50% Citric Acid Solution | 0.70% |
| MCC/9H4F 80/20 with 4% $CaCl_2$ | 0.35% |
| Water | to 100% |

A 80:20 composition of MCC/9H4F CMC with 4% $CaCl_2$ was dry blended with the LM Amidated Pectin Grinsted LA 410 before being added to the available water using high shear mixing in a Thermomixer. This was mixed for 7 minutes. While continuing to mix, a dry blend of the starch, sugar and K-sorbate was added to the mixture. While this was being added, the mixture was heated to 90° C., once at 90° C. the temperature was maintained and was allowed to mix for 10 minutes. Next, the fruit was added and mixed for another 10 minutes. Then the Ca-Lactate solution was added followed by the citric acid solution. The filling was immediately poured into jars. The initial viscosity of this sample was 3,050 cps and the samples were 35.5° Brix. When baked for 10 minutes at 400° F. the sample spread 69.72% on a flat cookie sheet. The amount of force needed to break this filling after 24 hour setup was 26.321 grams. This represents the hardness of the sample and is representative of gel strength.

Example 53

Fruit Filling

Samples were prepared using 0.40% of 80:20 MCC/9H4F CMC with 4% $CaCl_2$.

| Formulation | |
|---|---|
| Frozen Raspberries | 20.00% |
| Sugar | 33.70% |
| Modified Starch (colfo 67) | 2.00% |
| K-Sorbate | 0.10% |
| LM Amidated Pectin Grinsted LA 410 | 0.50% |
| 3% Ca-Lactate Solution | 0.50% |
| 50% Citric Acid Solution | 0.70% |
| MCC/9H4F 80/20 with 4% $CaCl_2$ | 0.40% |
| Water | to 100% |

A 80:20 composition of MCC/9H4F CMC with 4% CaCl$_2$ was dry blended with the LM Amidated Pectin Grinsted LA 410 before being added to the available water using high shear mixing in a Thermomixer. This was mixed for 7 minutes. While continuing to mix, a dry blend of the starch, sugar and K-sorbate was added to the mixture. While this was being added, the mixture was heated to 90° C., once at 90° C. the temperature was maintained and was allowed to mix for 10 minutes. Next, the fruit was added and mixed for another 10 minutes. Then the Ca-Lactate solution was added followed by the citric acid solution. The filling was immediately poured into jars. The initial viscosity of this sample was 3,275 cps and the samples were 35.5° Brix. When baked for 10 minutes at 400° F. the sample spread 55.36% on a flat cookie sheet. The amount of force needed to break this filling after 24 hour setup was 24.347 grams. This represents the hardness of the sample and is representative of gel strength.

Example 54

Bakery Fillings

Samples were prepared using 1.00% of 80:20 MCC/12M31P CMC with 3% CaCl$_2$.

| Formulation | |
|---|---|
| Corn Syrup 62 DE | 40.50% |
| Sugar | 16.00% |
| Vanilla Flavour | 0.10% |
| K-Sorbate | 0.10% |
| Land O Lakes Sweet Dairy Whey | 2.50% |
| Farinex VA-60-T (Tapioca) | 3.50% |
| Citric Acid | 0.09% |
| Titanium Dioxide | 0.09% |
| 80:20 MCC/12M31P with 3% CaCl$_2$ | 1.00% |
| Water | to 100% |

First, all the dry ingredients with the exception of the Avicel and the Titanium dioxide were dry blended together. Next, the Avicel was dispersed in a mix of the corn syrup and water using a Silverson mixer for 10 minutes. The titanium dioxide was then added and mixed for 1 minute. The Avicel mixture was then moved to a Thermomixer and the dry mix was added as the product was heated to 90° C.-95° C. and held for 10 minutes. The filling was then poured into jars at 70° C.-75° C. The setup viscosity of this sample was 150,000 cps and the sample was 58° Brix. The pH of the sample was 4.60. When baked for 10 minutes at 400° F. the sample spread 26.79% on a flat cookie sheet. The amount of force needed to break this filling after 24 hour setup was 24.406 grams, which represents the hardness of the sample and is representative of gel strength.

Example 55

Bakery Fillings

Samples were prepared using 1.00% of 80:20 MCC/HP1215C MCC with 4% CaCl$_2$.

| Formulation | |
|---|---|
| Corn Syrup 62 DE | 40.50% |
| Sugar | 16.00% |
| Vanilla Flavour | 0.10% |
| K-Sorbate | 0.10% |
| Land O Lakes Sweet Dairy Whey | 2.50% |
| Farinex VA-60-T (Tapioca) | 3.50% |
| Citric Acid | 0.09% |
| Titanium Dioxide | 0.09% |
| MCC/HP1215C with 4% CaCl$_2$ | 1.00% |
| Water | to 100% |

First, all the dry ingredients with the exception of the Avicel and the Titanium dioxide were dry blended together. Next, the Avicel was dispersed in a mix of the corn syrup and water using a Silverson mixer for 10 minutes. The titanium dioxide was added and mixed for 1 minute. The Avicel mixture was then moved to a Thermomixer and the dry mix was added as the product was heated to 90° C.-95° C. and held for 10 minutes. The filling was then poured into jars at 70° C.-75° C. This sample was then refrigerated for 24 hours. The setup viscosity of this sample was 180,000 cps and the sample was 57° Brix. The pH of the sample was 4.58. When baked for 10 minutes at 400° F. the sample spread 21.43% on a flat cookie sheet. The amount of force needed to break this filling after 24 hour setup was 22.229 grams, which represents the hardness of the sample and is representative of gel strength.

Results showed that the cream fillings prepared from the experimental samples stored at both refrigerated and ambient conditions were heat stable (within the desired spread range of 17%-47%) as they retained their texture and consistency when subjected to 400° F. for 10 minutes. In terms of cost reduction, the creamed fillings prepared with MCC/HP-1215C CMC and MCC/12M31P CMC exhibited bake stability similar to the control (RC-591 MCC) at a lower usage level.

Example 56

Whipped Toppings

Samples were prepared using 0.30% of 80:20 MCC/12M8P CMC with 5% CaCl$_2$ and 0.10% added 12M8P.

| Formulation | |
|---|---|
| Hydrogenated Vegetable Fat | 24.00% |
| Sugar | 12.00% |
| Sodium Caseeinate | 2.50% |
| 80/20 MCC/12M8P with 5% CaCl$_2$ | 0.30% |
| CMC 12M8P | 0.10% |
| Tween 60K | 0.105% |
| Starplex 90 | 0.315% |
| Water | to 100% |

First, the 80:20 MCC/12M8P and 5% CaCl$_2$ was dispersed in the available water and mixed for 15 minutes. Half the sugar was then dry blended with the 12M8P and added to the Avicel dispersion and mixed for 10 minutes. The other half of the sugar was dry blended with the sodium casienate and added to the mixture. Once all these products were fully incorporated, the mixture was heated to 145° F. Separately, the hydrogenated vegetable fat and the emulsifiers were mixed and heated to 140° F. Once both phases were heated to the desired temperatures, the melted fat phase was added to the aqueous phase. This mixture was then pasteurized at 160°

F.-170° F. for 30 minutes. The product was homogenized at 2500 psi (2000psi $1^{st}$ stage, 500psi $2^{nd}$ stage) and then the product was cooled and stored at 350° F-40° F. and aged for 24 hours. The product whipped in 3-6 minutes and the product showed good overrun, stiffness, and syneresis control.

Example 57

Whipped Toppings

Samples were prepared using 0.30% of 80:20 MCC/12M8P CMC with 5% $CaCl_2$ and 0.10% added 7HF.

| Formulation | |
| --- | --- |
| Hydrogenated Vegetable Fat | 24.00% |
| Sugar | 12.00% |
| Sodium Caseeinate | 2.50% |
| 80/20 MCC/12M8P with 5% $CaCl_2$ | 0.30% |
| CMC 7HF | 0.10% |
| Tween 60K | 0.105% |
| Starplex 90 | 0.315% |
| Water | to 100% |

First, the 80:20 MCC/12M8P and 5% $CaCl_2$ was dispersed in the available water and mixed for 15 minutes. Half of the sugar was then dry blended with the 7HF, added to the Avicel dispersion, and mixed for 10 minutes. The other half of the sugar was dry blended with the sodium casienate and added to the mixture. Once all these products were fully incorporated, the mixture was heated to 145° F. Separately, the hydrogenated vegetable fat and the emulsifiers were mixed and heated to 140° F. Once both phases were heated to the desired temperatures, the melted fat phase was added to the aqueous phase. This mixture was then pasteurized at 160° F.-170° F. for 30 minutes. The product was homogenized at 2500 psi (2000 psi $1^{st}$ stage, 500 psi $2^{nd}$ stage) and then the product was cooled and stored at 35° F-40° F. and aged for 24 hours. The product whipped in 3-6 minutes and the product showed good overrun, stiffness, and syneresis control.

Example 58

Rheology

Rheology of 1.5% (w/w) solids aqueous dispersions of a colloidal microcrystalline cellulose (80:20 MCC/12M8P CMC and 5.0% $CaCl_2$) composition and a commercial colloidal microcrystalline cellulose co-processed with sodium carboxy methyl cellulose was characterized at 20° C. using a $CSL_{100}$ Carri-Med instrument using parallel plates with a 1000 μm gap. Testing was performed in the oscillatory mode and in the rate sweep mode.

Samples were tested in the oscillatory mode at a frequency of 1 Hz after a 5 minute equilibration using an amplitude ramp (log mode, 20 points) for strains within the range of 0.1% to 100% strain. FIG. 1 shows the elastic modulus (G') and loss modulus (G") of the samples as a function of strain. Both colloidal microcrystalline cellulose samples form a gel network (G' is greater than G") and display similar values for the elastic modulus G' in the low strain viscoelastic region. Decreasing G' values at higher strains indicate that the gel network formed using the 80:20 MCC/12M8P CMC and 5.0% $CaCl_2$ colloidal microcrystalline cellulose composition is more easily broken down compared to the commercial microcrystalline cellulose co-processed with sodium carboxy methyl cellulose.

Samples were tested in a rate sweep mode subjected to a continuous ramp of (1) a 5 minute ramp to increase the shear rate from 0 sec-1 up to 100 sec-1, (2) a 5 minute equilibration at the maximum shear rate (100 sec-1), and (3) a 5 minute ramp down to 0 sec-1. FIG. 2 shows the viscosity profile vs. shear rate as the sample is subjected to increasing shear. The viscosity profile shows that both colloidal microcrystalline cellulose samples are highly shear thinning, while an aqueous hydrocolloid is only weakly shear thinning (near Newtonian behavior). The 80:20 MCC/12M8P CMC and 5.0% $CaCl_2$ colloidal microcrystalline cellulose composition has a lower viscosity profile across the entire shear rate range. FIG. 3 shows the thixotrophy profile of the samples. A conventional hydrocolloid shows essentially no thixotrophy. The shear stress response of the 80:20 MCC/12M8P CMC and 5.0% $CaCl_2$ colloidal microcrystalline cellulose composition at low shear rate differs significantly from the commercial microcrystalline cellulose co-processed with sodium carboxy methyl cellulose.

While not wishing to be bound by any theory, it is believed that the gel network formed by the 80:20 MCC/12M8P CMC and 5.0% $CaCl_2$ colloidal microcrystalline cellulose composition is different in nature than the gel network formed by the commercial microcrystalline cellulose co-processed with sodium carboxy methyl cellulose. The gel network of the commercial microcrystalline cellulose co-processed with sodium carboxy methyl cellulose is broken down more gradually, while the gel network formed by the 80:20 MCC/12M8P CMC and 5.0% $CaCl_2$ colloidal microcrystalline cellulose composition is broken down more readily. The differing rates at which the gel networks are broken down account for the similar elastic properties of the gel networks at low strain, but may explain the more rapid breakdown and lower viscosity when sheared exhibited by the gel network formed by the 80:20 MCC/12M8P CMC and 5.0% $CaCl_2$ colloidal microcrystalline cellulose composition.

Comparative Example 1

Low pH Beverage

Samples were prepared using 0.5% of an 80:20 MCC/12M8P CMC and 5.0% $CaCl_2$ composition with 0.25% of added Aqualon® 12M8P CMC. This sample of MCC/12M8P CMC was prepared by co-processing the slurry prepared from MCC wetcake and 12M8P CMC through the extruder and then spray drying without addition of the $CaCl_2$ salt in either step. Salt was dry blended with the spray dried coprocessed MCC/12M8P to make up 5% of the total weight.

| Formulation @ 3.5 g protein/8 oz serving | % by wt. |
| --- | --- |
| OJ concentrate | 4.21% |
| Sugar | 8.00% |
| Skim Milk | 20.00% |
| Nonfat Dry Milk | 1.73% |
| Citric Acid | 0.25% |
| MCC/12M8P CMC (80:20) and 5.0% $CaCl_2$ | 0.5% |
| 12M8P CMC | 0.25% |
| Water | to 100% |

The 80:20 MCC/12M8P CMC with 5.0% $CaCl_2$ powder was dispersed in water at 145-150° F. and mixed for 15 minutes. Additional 12M8P CMC was then added and mixed until hydrated, or for approximately 10 minutes. Milk and NFDM were added and the product was then mixed for an additional 20 minutes while still maintaining a temperature between 145-150° F. The product was then cooled to 100-110° F. The orange juice concentrate and citric acid (50/50 blend with DI water) were then added and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a viscosity of 10.8 cP and was unstable after 1 week with 45 mm serum; flocculation of the protein and a slight sediment.

Comparative Example 2

Low pH Beverage

Samples were prepared using 0.5% of an 80:20 MCC/12M8P CMC and 5.0% CaCl$_2$ composition with 0.25% of added Aqualon® 12M8P CMC. This sample was prepared by co-processing the MCC/12M8P CMC without the addition of the CaCl$_2$ salt until after the MCC and 12M8P CMC had been processed through the twin screw extruder. The salt was added into the slurry before spray drying to make up 5% of the total weight.

| Formulation @ 3.5 g protein/8 oz serving | % by wt. |
| --- | --- |
| OJ concentrate | 4.21% |
| Sugar | 8.00% |
| Skim Milk | 20.00% |
| Nonfat Dry Milk | 1.73% |
| Citric Acid | 0.25% |
| MCC/12M8P CMC (80:20) and 5.0% CaCl$_2$ | 0.5% |
| 12M8P CMC | 0.25% |
| Water | to 100% |

The 80:20 MCC/12M8P CMC with 5.0% CaCl$_2$ powder was dispersed in water at 145-150° F. and mixed for 15 minutes. Additional 12M8P CMC was then added and mixed until hydrated, or for approximately 10 minutes. Milk and NFDM were added and the product was then mixed for an additional 20 minutes while still maintaining a temperature between 145-150° F. The product was then cooled to 100-110° F. The orange juice concentrate and citric acid (50/50 blend with DI water) were then added and mixed for 5 minutes. An antifoam agent (Hi-Mar S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a viscosity of 16.6 cP and was unstable after 2 weeks due to moderate gelling and sediment formation.

Comparative Example 3

Fruit Filling

Samples were prepared using 0.50% of RC-591 MCC.

| Formulation | |
| --- | --- |
| Frozen Raspberries | 20.00% |
| Sugar | 33.70% |
| Modified Starch (colfo 67) | 2.00% |
| K-Sorbate | 0.10% |
| LM Amidated Pectin Grinsted LA 410 | 0.50% |
| 3% Ca-Lactate Solution | 0.50% |
| 50% Citric Acid Solution | 0.70% |
| RC-591 | 0.50% |
| Water | to 100% |

RC-591 MCC was dry blended with the LM Amidated Pectin Grinsted LA 410 before being added to the available water using high shear mixing in a Thermomixer. This was mixed for 7 minutes. While continuing to mix, a dry blend of the starch, sugar and K-sorbate was added to the mixture. While this was being added, the mixture was heated to 90° C., once at 90° C. the temperature was maintained and was allowed to mix for 10 minutes. Next, the fruit was added and mixed for another 10 minutes. Then the Ca-Lactate solution was added followed by the citric acid solution. The filling was immediately poured into jars. The initial viscosity of this sample was 3,750 cps and the sample was 37° Brix. When baked for 10 minutes at 400° F. the sample spread 39.29% on a flat cookie sheet. The amount of force needed to break this filling after 24 hour setup was 37.324 grams. This represents the hardness of the sample and is representative of gel strength.

Comparative Example 4

Spoonable Salad Dressings 7.5 grams of the Avicel® RC-591F MCC powder was dispersed in 60% of the available water at ambient temperature (70° F.) and mixed for 5 minutes. The xanthan gum was then dry blended with the sugar and then added and mixed until hydrated, or for approximately 5 minutes. Next, a dry blend of powdered egg yolk, EDTA, garlic powder, onion powder, potassium sorbate and mustard powder was added and mixed for 3 minutes or until fully incorporated. Liquid soybean oil was then added. Separately, the starch, vinegar, and salt were added to the other 40% of the available water. This mixture was heated to 185° F.-190° F. and held for 10 minutes, then cooled to 100° F. Both mixtures were added to a Hobart mixing bowl and mixed together until uniform. The resulting mixture was then milled and deaerated before filling. The resulting composition was as follows:

| Formulation | % by wt. |
| --- | --- |
| Soybean oil | 30.00 |
| Vinegar, 120 grain | 5.50 |
| Sugar | 4.00 |
| Salt | 2.50 |
| Avicel ® RC-591F | 0.75 |
| THERMFLO Food Starch- Modified | 3.50 |
| Powdered egg yolk | 1.50 |
| Calcium Imodium EDTA | 0.01 |

-continued

| Formulation | % by wt. |
|---|---|
| Xanthan gum | 0.40 |
| Garlic powder | 0.01 |
| Onion powder | 0.01 |
| Potassium sorbate | 0.10 |
| Mustard powder | 0.25 |
| Water | to 100% |

The samples were stored in 8 ounce jars and evaluated at 24 hr, 1, 2, 3, and 4-week intervals for viscosity. Viscosity was measured using a Brookfield RVT viscometer with the #4 T-bar spindle at 10 rpm. Viscosity results were as follows:

Viscosity Profiles for RC-591 at 0.75% in Conjunction with 0.40% Xanthan Gum

| 24 hour | 1 Week | 2 Weeks | 3 Weeks | 4 Weeks |
|---|---|---|---|---|
| 47000 | 48500 | 51500 | 51000 | 52000 |

Comparative Example 5

Bakery Fillings

Samples were prepared using 1.20% of Avicel® RC-591F MCC.

| Formulation | |
|---|---|
| Corn Syrup 62 DE | 40.50% |
| Sugar | 16.00% |
| Vanilla Flavour | 0.10% |
| K-Sorbate | 0.10% |
| Land O Lakes Sweet Dairy Whey | 2.50% |
| Farinex VA-60-T (Tapioca) | 3.50% |
| Citric Acid | 0.09% |
| Titanium Dioxide | 0.09% |
| Avicel® RC-591F | 1.20% |
| Water | to 100% |

First, all the dry ingredients with the exception of the Avicel and the titanium dioxide were dry blended together. Next, the Avicel was dispersed in a mix of the corn syrup and water using a Silverson mixer for 10 minutes. The titanium dioxide was then added and mixed for 1 minute. The Avicel mixture was then moved to a Thermomixer and the dry mix was added as the product was heated to 90° C.-95° C. and held for 10 minutes. The filling was then poured into jars at 70° C.-75° C. The setup viscosity of this sample was 195,000 cps and the sample was 58° Brix. The pH of the sample was 4.75. When baked for 10 minutes at 400° F. the sample spread 21.43% on a flat cookie sheet. The amount of force needed to break this filling after 24 hour setup was 28.128; grams, which represents the hardness of the sample and is representative of gel strength.

It is to be appreciated that certain features of the invention which are, for clarity, described above in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

We claim:

1. A composition comprising microcrystalline cellulose, a salt, and at least one water-soluble cellulose ether having a degree of substitution of about 0.9 to about 1.5, wherein the weight ratio of the microcrystalline cellulose and the cellulose ether is from about 70:30 to about 90:10 and the concentration of the salt is about 2% to about 6% by dry weight of the composition.

2. The composition of claim 1 wherein the weight ratio of the microcrystalline cellulose and the cellulose ether is about 80:20.

3. The composition of claim 1 wherein the cellulose ether is an alkali metal carboxymethylcellulose.

4. The composition of claim 3 wherein the cellulose ether is sodium carboxymethylcellulose.

5. The composition of claim 4 wherein the sodium carboxymethylcellulose has a degree of substitution of from about 0.9 to about 1.2.

6. The composition of claim 1 wherein the cellulose ether is methylcellulose, methylhydroxyethylcellulose, methylhydroxypropylcellulose, hydroxyethylcellulose, hydroxypropylcellulose, ethoxyhydroxyethylcellulose, or a combination thereof.

7. The composition of claim 1 wherein the cellulose ether is methylcellulose, hydroxypropylmethylcellulose, or hydroxypropylcellulose.

8. The composition of claim 7 wherein the cellulose ether has a degree of substitution of about 0.9 to about 1.2.

9. The composition of claim 1 comprising from about 4% to about 5% by dry weight of the salt.

10. The composition of claim 9 wherein the salt includes a divalent cation selected from Ca and Mg.

11. The composition of claim 10 wherein the salt is $CaCl_2$.

12. An edible food product comprising a composition of claim 1.

13. The edible food product of claim 12 wherein the food product is an emulsion, sauce, retorted soup, food dressing, ultra high temperature and retort processed protein and nutritional beverage, ultra high temperature processed low pH protein-based beverage, ultra high temperature Ca fortified beverage, high temperature and retort processed milk cream, low pH frozen dessert, aerated dairy food system, aerated non-dairy food system, cultured dairy product, bakery filling, or bakery cream.

14. The edible food product of claim 12 further comprising a protein, fruit juice, vegetable juice, a fruit-flavored substance, or any combination thereof.

15. The edible food product of claim 12 comprising 0.05% to 3.5% by weight of the composition.

16. The edible food product of claim 12 comprising 0.2% to 2% by weight of the composition.

17. The edible food product of claim 12 wherein the cellulose ether is sodium carboxymethylcellulose having a degree of substitution of about 0.9 to 1.2.

18. An industrial suspension comprising a composition comprising microcrystalline cellulose, a salt, and at least one water-soluble cellulose ether having a degree of substitution of about 0.9 to about 1.5, wherein the weight ratio of the microcrystalline cellulose and the cellulose ether is from about 70:30 to about 90:10, the concentration of the salt is about 2% to about 6% by dry weight of the suspension, and the suspension is adapted for use in a pharmaceutical, cosmetic, personal care product, agriculture product, or chemical formulation.

19. The industrial suspension of claim 18 wherein the cellulose ether is sodium carboxymethylcellulose.

20. The composition of claim 1, wherein said cellulose ether has a degree of substitution of 1.1 to 1.5.

* * * * *

UNITED STATES PATENT AND TRADEMARK OFFICE
CERTIFICATE OF CORRECTION

PATENT NO. : 7,879,382 B2  
APPLICATION NO. : 11/536436  
DATED : February 1, 2011  
INVENTOR(S) : Domingo C. Tuason et al.

Page 1 of 1

It is certified that error appears in the above-identified patent and that said Letters Patent is hereby corrected as shown below:

Column 48, line 51, insert --ultra-- before "high"

Signed and Sealed this
Twenty-sixth Day of April, 2011

David J. Kappos
*Director of the United States Patent and Trademark Office*